(12) United States Patent
Matsugu

(10) Patent No.: US 7,274,819 B2
(45) Date of Patent: Sep. 25, 2007

(54) PATTERN RECOGNITION APPARATUS USING PARALLEL OPERATION

(75) Inventor: Masakazu Matsugu, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 10/156,942

(22) Filed: May 30, 2002

(65) Prior Publication Data

US 2002/0181775 A1 Dec. 5, 2002

(30) Foreign Application Priority Data

May 31, 2001 (JP) ............................. 2001-164510

(51) Int. Cl.
*G06K 9/00* (2006.01)

(52) U.S. Cl. .................................... 382/181

(58) Field of Classification Search ................ 382/141, 382/144, 145, 146, 147, 148, 149, 181, 209, 382/217
See application file for complete search history.

(56) References Cited

U.S. PATENT DOCUMENTS

| | | | | |
|---|---|---|---|---|
| 5,058,184 A | * | 10/1991 | Fukushima | 382/158 |
| 5,329,594 A | * | 7/1994 | Maruno et al. | 382/159 |
| 5,493,688 A | * | 2/1996 | Weingard | 382/157 |
| 5,627,943 A | * | 5/1997 | Yoneda et al. | 706/31 |
| 5,664,065 A | * | 9/1997 | Johnson | 706/20 |
| 5,664,069 A | * | 9/1997 | Takatori et al. | 706/31 |
| 5,987,170 A | * | 11/1999 | Yamamoto et al. | 382/170 |
| 6,088,490 A | * | 7/2000 | Iwata et al. | 382/312 |
| 6,185,337 B1 | * | 2/2001 | Tsujino et al. | 382/227 |
| 6,647,139 B1 | * | 11/2003 | Kunii et al. | 382/159 |
| 6,687,386 B1 | * | 2/2004 | Ito et al. | 382/103 |
| 6,829,384 B2 | * | 12/2004 | Schneiderman et al. | 382/154 |

2002/0038294 A1 3/2002 Matsugu ...................... 706/20

(Continued)

FOREIGN PATENT DOCUMENTS

| | | |
|---|---|---|
| EP | 0 926 885 | 6/1999 |
| JP | 6-176158 | 6/1994 |
| JP | 9-153021 | 6/1997 |

(Continued)

OTHER PUBLICATIONS

John G. Daugman, "Complete Discrete 2-D Gabor Transforms by Neural Networks for Image Analysis and Compression," IEEE Transactions on Acoustics, Speech, and Signal Processing, vol. 36, No. 7, 1169-1179 (Jul. 1988).

(Continued)

*Primary Examiner*—Matthew C. Bella
*Assistant Examiner*—Tom Y Lu
(74) *Attorney, Agent, or Firm*—Fitzpatrick, Cella, Harper & Scinto

(57) ABSTRACT

In a pattern recognition apparatus, a local area recognition module is constructed with operation elements having predetermined operation characteristics. Pattern data of a predetermined size in input data is acquired by time-sequentially performing inputting process at a plurality of times via a local area scanning unit, and information indicating the position of pattern data in the input data is output. The local area recognition module detects a feature of a predetermined middle-order or high-order category from the pattern data. A consolidation module time-sequentially consolidates outputs from the local area recognition module on the basis of the position information and the category of the feature thereby producing feature detection map information. A judgment unit outputs position information and category information of a high-order feature present in the input data, on the basis of the output from the time-sequential consolidation module.

48 Claims, 14 Drawing Sheets

U.S. PATENT DOCUMENTS

2002/0159627 A1* 10/2002 Schneiderman et al. .... 382/154
2002/0181765 A1    12/2002 Mori et al. ................. 382/158

FOREIGN PATENT DOCUMENTS

| JP | 2741793   | 1/1998 |
| JP | 11-15495  | 1/1999 |
| JP | 11-15945  | 1/1999 |
| JP | 11-196332 | 7/1999 |

OTHER PUBLICATIONS

John G. Daugman, "Uncertainty Relation for Resolution in Space, Spatial Frequency, and Orientation Optimized by Two-dimensional Visual Cortical Filters," J. Opt. Soc. Am. A/vol. 2, No. 7, 1160-1169 (Jul. 1985).

S. Y, Kung, "Mapping Neural Nets to Array Architectures," Digital Neural Networks, 340-361 (PTR Prentice Hall 1993).

John Lazzaro, et al., "Silicon Auditory Processors as Computer Peripherals," Advances in Neural Information Processing Systems 5, 820-827 (Morgan Kaufmann 1993).

Yann LeCun and Yoshua Bengio, "Convolutional Networks for Images, Speech, and Time Series," The Handbook of Brain Theory Neural Networks, 255-258 (Michael A. Arbib ed. MIT Press 1995).

B. D. Terris, et al., "Near-field Optical Data Storage Using a Solid Immersion Lens," Appl. Phys. Lett., vol. 65, No. 4, 388-390 (Jul. 25, 1994).

Yasuhiro Ota and Bogdan M. Wilamowski, "Analog Implementation of Pulse-Coupled Neural Networks," IEEE Transactions on Neural Networks, vol. 10, No. 3, 539-544 (May 1999).

* cited by examiner

FIG. 6A
| CATEGORY | RELATIVE POSITION | |
|---|---|---|
| EYE | $r_{e-e1,\,k}$ | $r_{e-e2,\,k}$ |
| NOSE | $r_{e-n,\,k}$ | |
| MOUTH | $r_{e-m,\,k}$ | |
CATEGORY OF A MIDDLE-ORDER PATTERN DETECTED FIRST
(EYE, SCALE LEVEL = k)
FIG. 6B-1
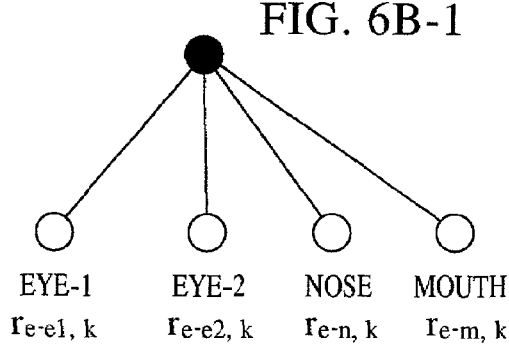
EYE-1     EYE-2     NOSE      MOUTH
$r_{e-e1,\,k}$  $r_{e-e2,\,k}$  $r_{e-n,\,k}$  $r_{e-m,\,k}$
FIG. 6B-2
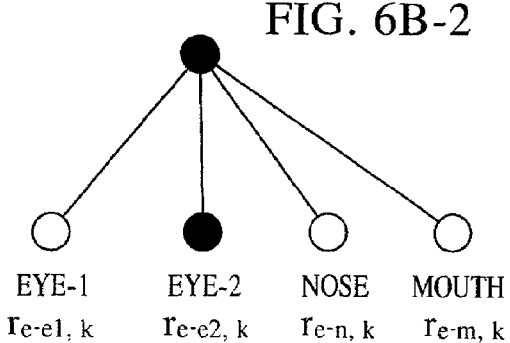
EYE-1     EYE-2     NOSE      MOUTH
$r_{e-e1,\,k}$  $r_{e-e2,\,k}$  $r_{e-n,\,k}$  $r_{e-m,\,k}$
FIG. 6B-3
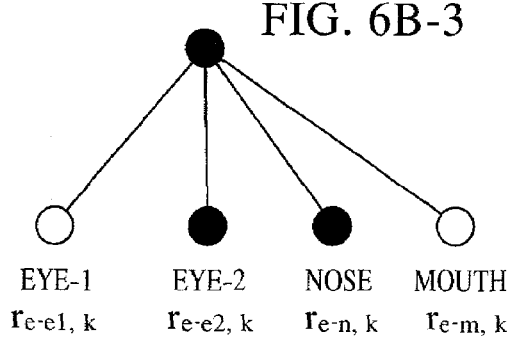
EYE-1     EYE-2     NOSE      MOUTH
$r_{e-e1,\,k}$  $r_{e-e2,\,k}$  $r_{e-n,\,k}$  $r_{e-m,\,k}$
FIG. 6B-4
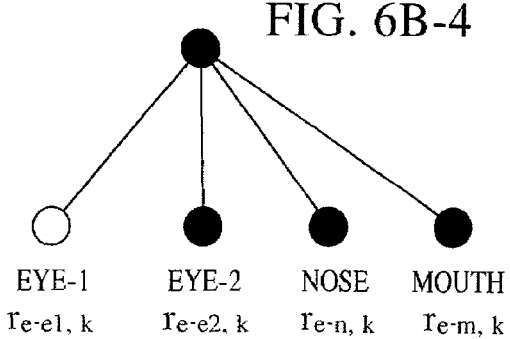
EYE-1     EYE-2     NOSE      MOUTH
$r_{e-e1,\,k}$  $r_{e-e2,\,k}$  $r_{e-n,\,k}$  $r_{e-m,\,k}$

PATTERN RECOGNITION APPARATUS USING PARALLEL OPERATION

BACKGROUND OF THE INVENTION

1. Field of the Invention

The present invention relates to a pattern recognition apparatus using a parallel operation.

2. Description of the Related Art

Image/speech recognition techniques can be generally classified into two types. In one type, a recognition algorithm specialized for recognition of a particular type of image/voice is described in the form of computer software and executed sequentially. In the other type, recognition is performed using a dedicated parallel image processor (such as a SIMD or MIMD machine).

One widely-used image recognition algorithm is to calculate a feature value indicating the degree of similarity between an image of an object and an object model. In this technique, model data of an object to be recognized is represented in the form of a template model, and recognition is performed by calculating the degree of similarity between an input image (or a feature vector thereof) and a template or by calculating a high-order correlation coefficient. The calculation may be performed by means of hierarchical parallel processing (Japanese Examined Patent Application Publication No. 2741793).

When the degree of similarity in terms of a local part of an object model is evaluated, if a part of an object is hidden, there is a possibility that difficulty occurs in the evaluation of the degree of similarity. A technique for avoiding such difficulty is disclosed in Japanese Patent Laid-Open No. 11-15495. In this technique, matching between a local part of an object and a local model is evaluated, and the likelihood of presence of the object is calculated for various local parts of the object. In accordance with the Dempster-Shafer technique or the fuzzy technique, the overall likelihood of presence of the image is then determined from the likelihood of presence calculated on the basis of individual local parts, thereby enhancing the reliability of recognition.

Japanese Patent Laid-Open No. 6-176158 discloses a technique in which the degree of similarity of feature vectors of an input pattern with respect to a category is calculated individually for each feature vector, and the overall degree of similarity is determined using the degrees of similarity of respective feature vectors normalized with respect to a maximum degree of similarity. Finally, recognition is performed on the basis of the overall degree of similarity.

Japanese Patent Laid-Open No. 9-153021 discloses a parallel processing apparatus in which an input digital signal is divided into a plurality of parts and the divided parts are processed in parallel by a plurality of processors, wherein division of the input digital signal into the plurality of parts is performed such that the calculation cost is minimized and the performance is optimized depending on the input digital signal.

However, in the technique disclosed in Japanese Patent Laid-Open No. 11-15945, when there are a plurality of categories in object models, it is not disclosed which local model should be employed and how matching results are consolidated. Furthermore, when the overall likelihood of presence of a feature is determined using non-additive measures on the basis of the Dempster-Shafer technique, it is not necessarily ensured that the resultant overall likelihood indicates optimum estimation.

Another problem is that when the size of an object in an image to be recognized is different from that of object model, or when an image includes a plurality of objects with different sizes, the technique encounters difficulty. Recognition may be possible if a plurality of object models corresponding to various sizes are prepared and if the degree of similarity is calculated one by one for all object models corresponding to different sizes. However, this needs a large-scale circuit (large memory size) and the processing efficiency is low.

In the parallel processing apparatus disclosed in Japanese Patent Laid-Open No. 9-153021, if input data includes a plurality of objects with different sizes, it is difficult to properly divide the input data. That is, when the type or size of an object is unknown, if an input signal is simply divided in a fixed manner, parallel processing for pattern recognition cannot be properly performed.

In the pattern recognition apparatus disclosed in Japanese Patent Laid-Open No. 6-176158, the improvement in the memory efficiency and the reduction in the circuit size cannot be achieved. In general, when pattern recognition is performed using a hierarchical parallel processing circuit (using a technique disclosed, for example, in Japanese Examined Patent Application Publication No. 2741793), detection of a plurality of features at sampling point positions on the input data is performed simultaneously and in parallel. Therefore, depending on the size of an input image, a large number of elements are required in a low-level layer, and thus a large-scale circuit is needed.

SUMMARY OF THE INVENTION

It is object of the present invention to provide pattern recognition processing capable of efficiently performing recognition using a small-scale circuit for detecting (recognizing) a pattern of a predetermined category and size.

It is another object of the present invention to provide pattern recognition processing capable of efficiently extracting a local feature (pattern) of a specific category using a small-scale circuit, for various sizes of the local feature (pattern).

It is still another object of the present invention to provide pattern recognition processing capable of detecting an object in a highly reliable fashion even when the object to be detected is partially occluded by another object.

According to one aspect, the present invention which achieves these objectives relates to a pattern recognition apparatus comprising time-division data inputting means for inputting data by time-sequentially inputting pattern data, which is part of the input data and which has a predetermined size, a plurality of times; position information inputting means for inputting position information of the pattern data in the input data; feature detection means including an operation element having a predetermined operation characteristic, for detecting a feature of a predetermined middle-order or high-order category from the pattern data; time-sequential consolidation means for time-sequentially consolidating the outputs from the feature detection means on the basis of the position information and the category of the feature and producing feature detection map information; and judgment means for outputting position information and category information of a high-order feature present in the input data, on the basis of the output from the time-sequential consolidation means.

According to another aspect, the present invention which achieves these objectives relates to a pattern recognition apparatus comprising data inputting means for scanning pattern data with a predetermined size, which is part of input data, thereby inputting the pattern data; detection means for detecting a predetermined feature from the pattern data; scanning position changing means for changing, on the basis of the type of the feature, scanning position at which the pattern data is scanned by the data inputting means; consolidation means for consolidating a plurality of features detected at different scanning positions and determining, on the basis of consolidation result, the likelihood of presence of a specific pattern; and judgment means for outputting position information indicating the position of the specific pattern and information indicating the type of the specific pattern, on the basis of the output from the consolidation means.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6A is a table showing an example of data in the form of a list representing relative positions of middle-order features.

FIG. 6B is a diagram illustrating a process of detecting middle-order features.

DESCRIPTION OF THE PREFERRED EMBODIMENTS

Embodiments of the present invention are described in detail below with reference to the accompanying drawings.

First Embodiment

Brief Description of the General Construction and Respective Elements

Figure 1:
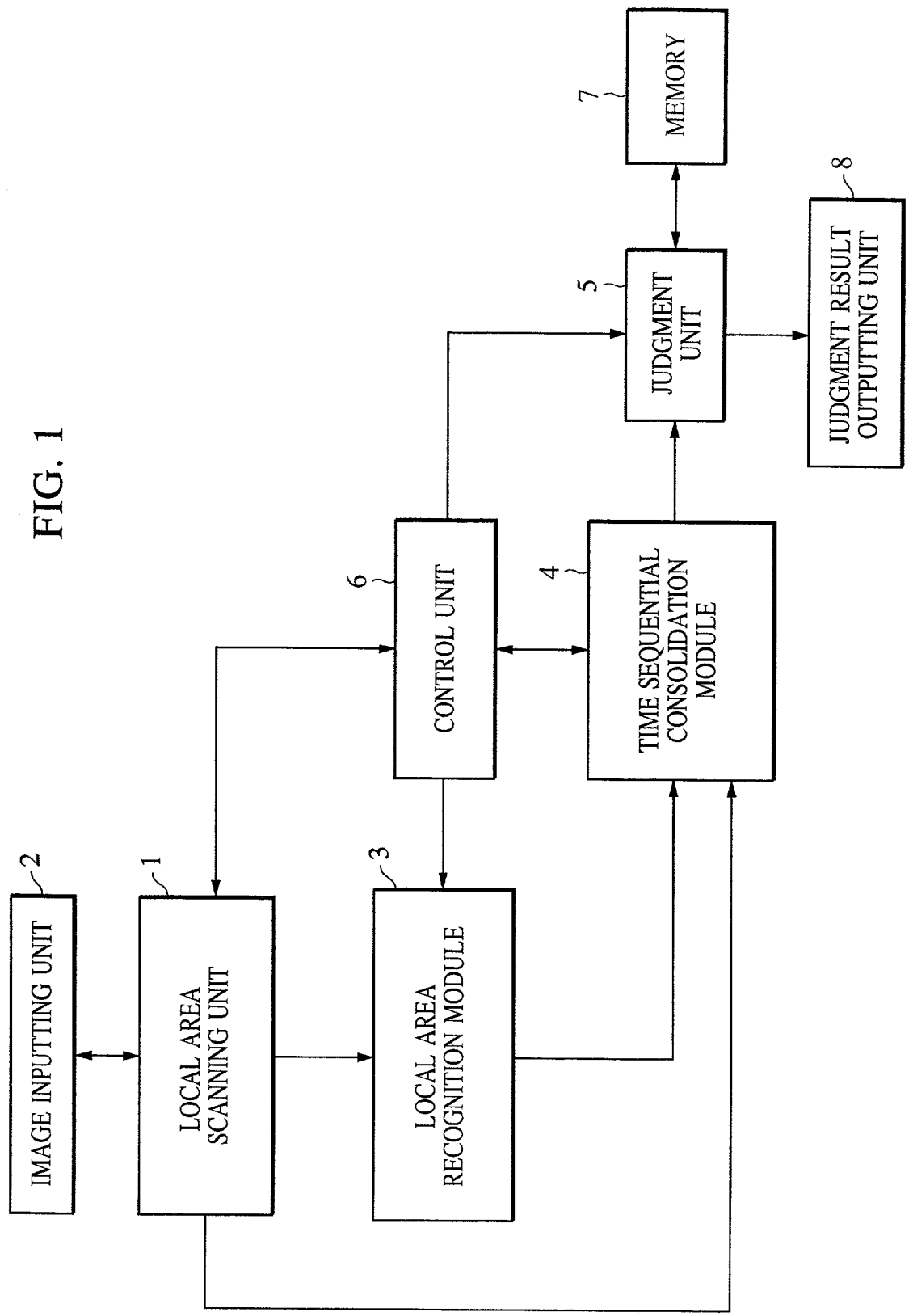
FIG. 1 is a diagram illustrating main parts of a first embodiment of the present invention.

A first embodiment is described in detail below with reference to the accompanying drawings. FIG. 1 generally illustrates a pattern recognition apparatus according to the first embodiment. The pattern recognition apparatus includes a local area scanning unit 1, an image inputting unit 2, a local area recognition module 3, a time-sequential consolidation module 4, a judgment unit 5, and a control unit 6 for controlling the operations of the above units or modules. Functions of the respective units/modules are described below.

In accordance with a control signal supplied from the control unit 6, the local area scanning unit 1 defines, in the data input via the image inputting unit 2, a local area with a rectangular shape (block shape or another shape) having a size determined by the control unit 6, at a sampling point position which is changed one by one. In the block scanning process, it is desirable that a current local area partially overlap with a previous local area so that no reduction in detection accuracy occurs when a feature is present near a boundary of these local areas.

The local area scanning unit 1 outputs a read control signal to the image inputting unit 2 (a sensor such as a CMOS sensor). In response, the image inputting unit 2 reads an image signal from the block-shaped local area and provides the resultant signal to the local area scanning unit 1. The above reading process may be performed in accordance with a known technique (for example, a technique disclosed in Japanese Patent Laid-Open No. 11-196332, filed by the present applicant). In a case where a CCD is used as the sensor, an image is temporarily stored in a frame memory or the like, and then the image stored therein is scanned from a specified block-shaped local area to another.

The local area recognition module 3 includes a hierarchical neural network circuit for detecting geometrical features of various orders from low to high. The local area recognition module 3 receives the data of the block-shaped local area defined above and informs the consolidation module 4 whether the local area includes a middle-order or high-order pattern of a predetermined category.

The time-sequential consolidation module 4 receives position information from the local area scanning unit 1 and consolidates the data, associated with block-shaped local areas at different positions, output from the local area recognition module 3 on the basis of the position information. On the basis of the consolidation result, the time-sequential consolidation module 4 outputs information indicating whether a specific pattern has been detected. If the time-sequential consolidation module 4 obtains a detection signal (position information and category information) of a high-order pattern (of an object to be recognized) from the local area recognition module 3, the time-sequential consolidation module 4 directly transfers the detection information to the judgment unit 5.

In the case where the specific pattern has been detected, the judgment unit 5 checks the output of the time-sequential consolidation module 4 on the basis of a judgment parameter supplied from the control unit 6 and outputs information indicating the position of the detected pattern in the input data and information indicating the category of the detected pattern.

Figure 2:
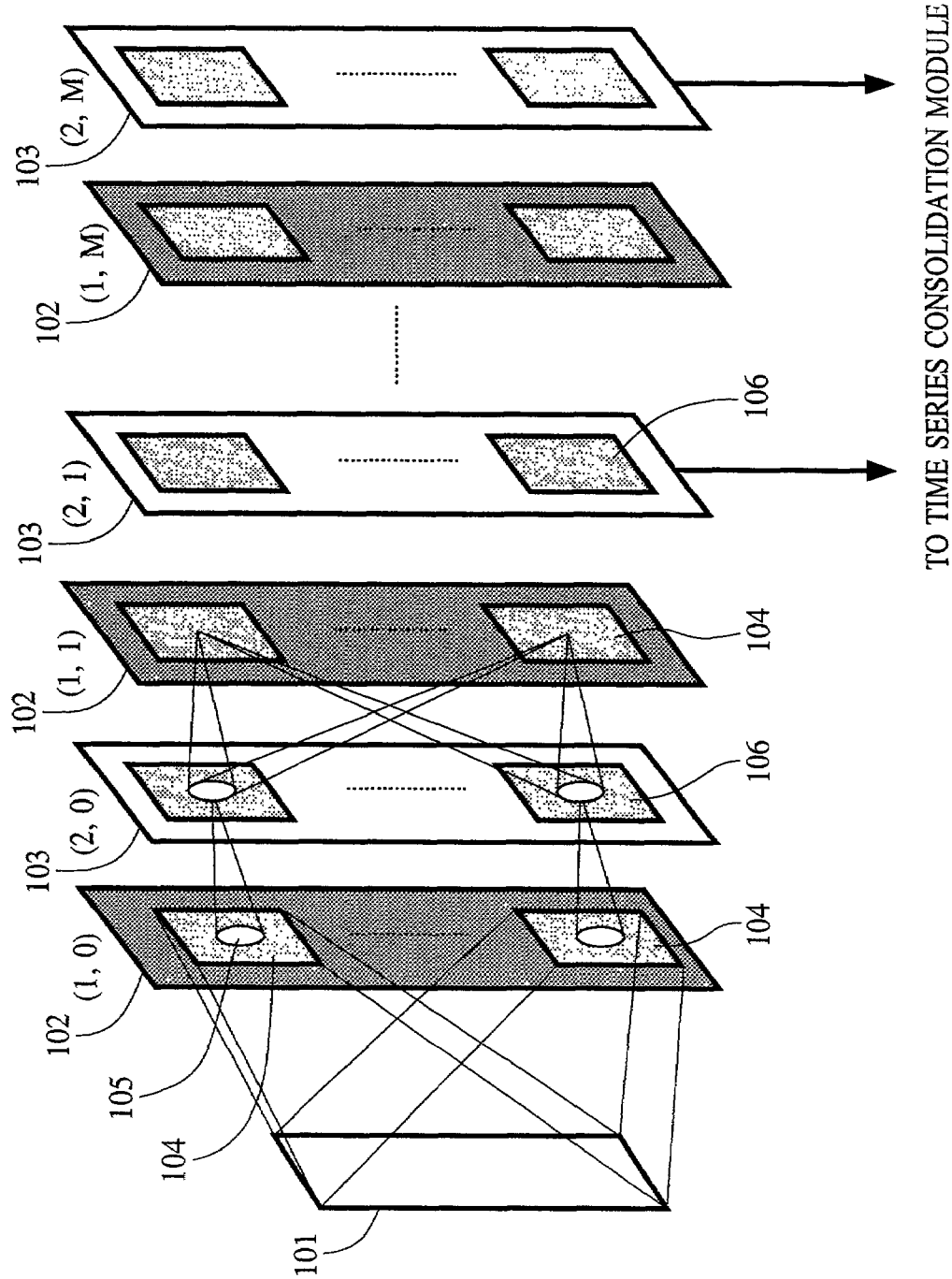
FIG. 2 is a diagram illustrating main parts of a local area recognition module.

The local area recognition module 3 is described in detail below with reference to FIG. 2. This module 3 mainly deals with information associated with recognition (detection) of an object feature or a geometric feature in a local area of input data. Basically, the local area recognition module 3 has a structure similar to the convolutional network structure (LeCun, Y. and Bengio, Y., 1995, "Convolutional Networks for Images Speech, and Time Series" in Handbook of Brain Theory and Neural Networks (M. Arbib, Ed.), MIT Press, pp. 255-258), except that reciprocal local connection between layers in the network is allowed (as will be described later). The final output indicates the recognition result, that is, the category of the recognized object and the position thereof in the input data.

A data input layer 101 inputs local area data from a photoelectric conversion device such as a CMOS sensor or a CCD device (image inputting unit 2), under the control of the local area scanning unit 1. Alternatively, the data input layer 101 may input high-order data obtained as a result of analysis (such as principal component analysis or vector quantization) performed by particular data analysis means.

The operation of inputting an image is described below. A first feature detection layer 102 (1, 0), performs, by means of Gabor wavelet transformation or another multiple resolution processing method, detection of a low-order local feature (that may include a color feature in addition to a geometric feature) of an image pattern received from the data input layer 101, for a plurality of scale levels or a plurality of feature categories in the local area centered at each scanning point. To this end, the feature detection layer 102 (1, 0) has a receptive field 105 whose structure corresponds to the type of the feature (for example, in a case where a line segment in a particular direction is extracted as a geometric feature, the receptive field has a structure corresponding to the direction), and the feature detection layer 102 (1, 0) includes neuron elements that generate pulse trains in accordance with the likelihood of that feature's presence.

As is described in detail in U.S. patent application Ser. No. 09/878,269 filed by the present applicant, feature detection layers 102 (1, k) (k≧0) form, as a whole, processing channels for various resolutions (scale levels). For example, when the Gabor wavelet transformation is performed by the feature detection layer 102 (1, 0), a set 104 of feature detection cells, having receptive field structures including Gabor filter kernels having different orientation selectivity for the same scale level, form a processing channel in the feature detection layer 102 (1, 0). Furthermore, feature detection cells in a following layer 102 (1, 1), which receive data output from these feature detection cells in the feature detection layer 102 (1, 0) (and which detect a higher-order feature), belong to the same processing channel as that described above. In following feature detection layers 102 (1, k) (k>1), feature detection cells that receive data output from a set 106 of the feature a set of detection cells that form a particular channel in a feature consolidation layer 103 (2, k−1), which will be described in more detail below, belong to the same channel as that particular channel.

Herein, a Gabor wavelet has a shape obtained by modulating, using a Gaussian function, a sinusoidal wave in a particular direction with a particular spatial frequency. A set of filters is provided to achieve the wavelet transformation, wherein each filter has a similar function shape but is different in principal direction and size. It is known that a wavelet has a localized function shape in the spatial frequency domain and also in the real spatial domain, and that it has minimum joint uncertainty in position and spatial frequency. That is, the wavelets are functions that are most localized in both the real space and frequency space (J, G.

Daugman (1985), "Uncertainty relation for resolution in space, spatial frequency, and orientation optimized by two-dimensional visual cortical filters", Journal of Optical Society of America A, vol. 2, pp. 1160-1169).

More detailed description of the manner of performing Gabor wavelet transformation using a neural network can be found in a paper by Daugman (IEEE Trans. on Acoustics, Speech, and Signal Processing, vol. 36, pp. 1169-1179, 1988). Although the above paper does not disclose the manner of dealing with a part near a boundary in a local area (manner of retaining coefficients of Gabor wavelet transformation), it is desirable that Gabor wavelet transformation coefficients be multiplied by weighting factors depending on the distance of the local area from the center so as to minimize the influence of deviation of values from the ideal Gabor wavelet transformation coefficients near the boundary. Furthermore, as described below, it is assumed that intermediate results obtained in the scanning process are stored in a predetermined storage, for use in the consolidation process.

In processing channels, processes for different scale levels (resolutions) assigned to the respective channels are performed to detect and recognize features of various orders from low to high by means of the hierarchical parallel processing.

The feature consolidation layer 103 (2, 0) includes neuron elements which output pulse trains and which have predetermined receptive field structures ("receptive field" refers to a range of connection with output elements in the immediately preceding layer, and "receptive field structure" refers to a distribution of connection weights). The feature consolidation layer 103 (2, 0) consolidates the outputs from neuron elements of the same receptive field in the feature detection layer 102 (1, 0) (by means of sub-sampling or the like using local averaging). The respective neurons in a feature consolidation layer have common receptive field structures assigned to that feature consolidation layer.

The following feature detection layers 102 ((1, 1), (1, 2), . . . , (1, M)) and the feature consolidation layer 103 ((2, 1), (2, 2), . . . , (2, M)) each have their own receptive field structures, wherein the feature detection layers 102 (1, 1), (1, 2), . . . , and (1, M) detect different features, and the feature consolidation layers 103 (2, 1), (2, 2), . . . , and (2, M) respectively consolidate the features supplied from the feature detection layer at the preceding stage. The feature detection layers 102 are connected (interconnected) so that the feature detection layers 102 can receive the outputs from the cells, belonging to the same channels, in the feature consolidation layer at the preceding stage. In the feature consolidation layer, sub-sampling is performed, for example, to average the outputs from feature detection cells in local areas (local receptive fields of neurons in the feature consolidation layer) for each of the feature categories.

Figure 3A:
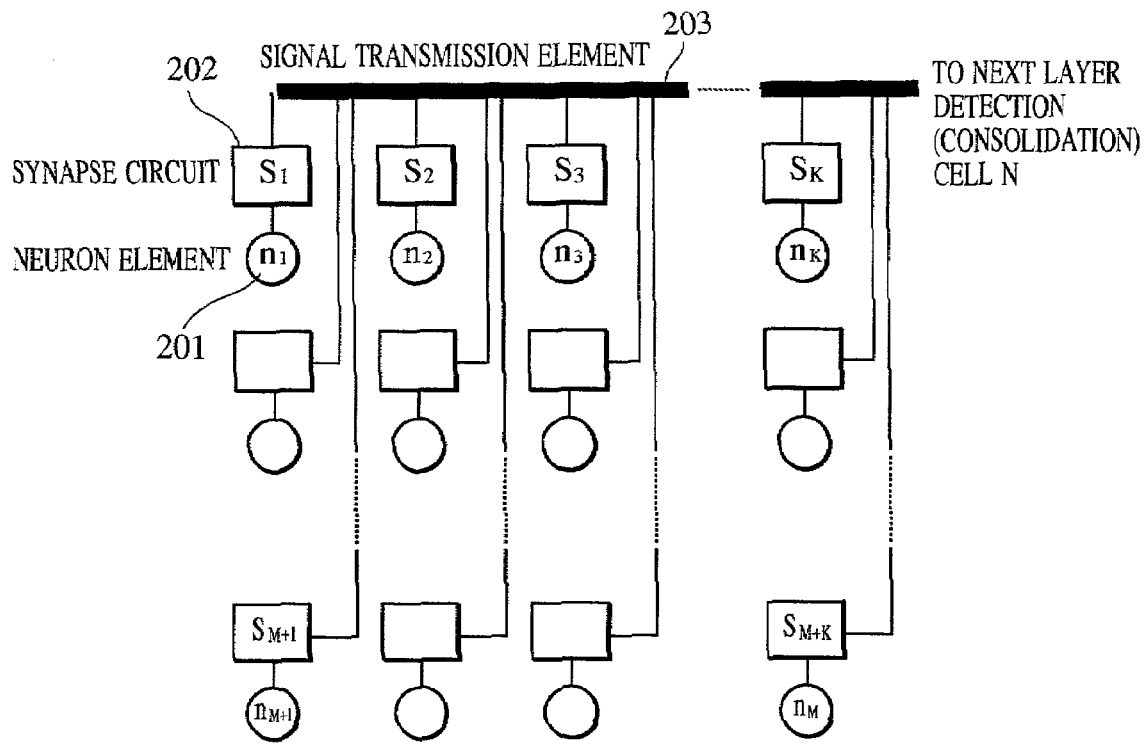
FIG. 3A is a diagram illustrating coupling between layers.

FIG. 3A is a diagram illustrating connection between layers. As shown in FIG. 3A, neuron elements 201 in different layers are connected with each other via a signal transmission element 203 (an interconnecting line or a delay line) corresponding to an axial filament or a dendrite of a neuron and via a synapse circuit 202. FIG. 3A shows connection structure associated with outputs (inputs when viewed from feature detection (consolidation) cells) from neurons ($n_i$) of feature consolidation (detection) cells forming a receptive field of a specific feature detection (consolidation) cells. Herein, a signal transmission element denoted by a bold line serves as a common bus line, through which pulse signals output from a plurality of neurons are time-sequentially transmitted. Signals may be fed back from subsequent cells in a similar manner. More specifically, input signals and output signals may be treated using the same configuration by means of a time-division technique, or using a construction including dual systems similar to that shown in FIG. 3A, for inputting signals (to dendrites) and outputting signals (from axons).

In the synapse circuit 202, excitatory connection results in amplification of a pulse signal. On the other hand, inhibitory connection results in attenuation of a pulse signal. When information is transmitted using a pulse signal, amplification and attenuation can be achieved by one of amplitude modulation, pulse width modulation, pulse phase modulation, and pulse frequency modulation. In the present embodiment, the synapse circuit 202 is mainly used to perform pulse phase modulation, whereby amplification of a signal is converted to a substantial advance of pulse arrival time corresponding to a feature and attenuation is converted to a substantially delay. That is, the synapitc connection gives arrival position (phase) in time, corresponding to a feature, at a destination neuron. Qualitatively, excitatory connection results in an advance of pulse arrival time with respect to a reference phase, and inhibitory connection results in a delay of pulse arrival time.

In FIG. 3A, each neuron element $n_j$ is of the integrate-and-fire type that will be described later and outputs a pulse signal (spike train). A synapse circuit and a neuron element may be combined into a circuit block as shown in FIG. 3C.

Neurons included in respective layers are described below. Each neuron element is based on a model extended from a fundamental neuron model called an integrate-and-fire neuron model. These neurons are similar to the integrate-and-fire neurons in that when the linear sum, in time/space domain, of input signals (pulse train corresponding to action potential) exceeds a threshold value, the neuron fires and outputs a pulse signal.

Figure 3B:
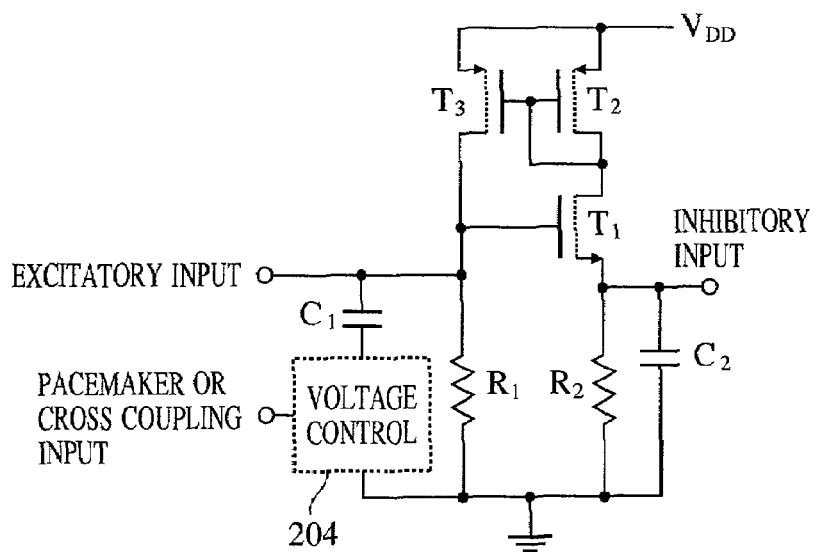
FIG. 3B is a diagram illustrating a basic circuit configuration of a pulse generator serving as a neuron element.
Figure 3C:
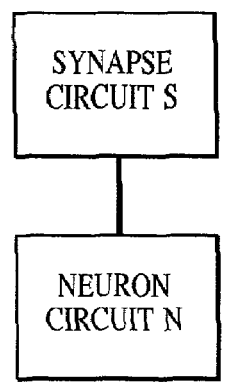
FIG. 3C is a diagram illustrating another example of coupling between a synapse circuit and a neuron element.

FIG. 3B shows an example of a basic circuit configuration of a pulse generator (CMOS circuit) constructed so as to serve as a neuron element, wherein this circuit configuration is based on a known circuit (IEEE Trans. on Neural Networks Vol. 10, pp. 540). This circuit is configured so that both excitatory and inhibitory inputs can be input.

The operation and the mechanism of the firing of the neurons are not described in further detail herein, because they are not essential to the present invention.

Time-Sequential Consolidation

The operation of the part from the local area recognition module 3 and the time-sequential consolidation module 4 is described in detail below. In the present embodiment, the degree of consistency between a middle-order pattern detected in a local area during the scanning process and a high-order pattern is evaluated in terms of the relative position and the type. In this process, on the basis of the type of a middle-order pattern that is detected first, the type and the position of a middle-order pattern that will be detected next is predicted, and the scanning position is jumped in accordance with the prediction. This makes it possible to detect a pattern more efficiently than can be detected by means of uniform scanning such as raster scanning.

Figure 4:
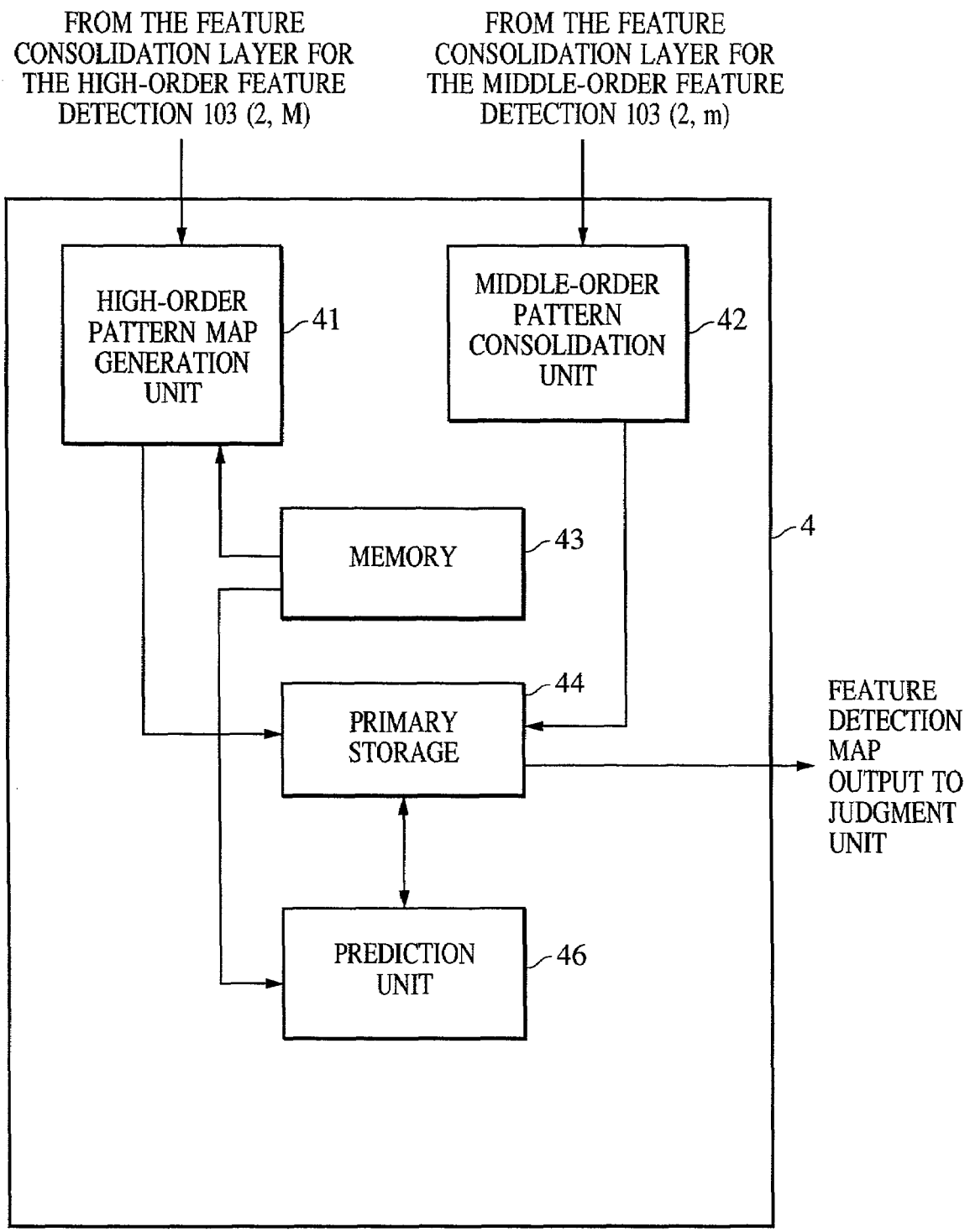
FIG. 4 is a diagram illustrating a time-sequential consolidation module used in the first embodiment.

As shown in FIG. 4, the time-sequential consolidation module 4 includes a high-order pattern map generation unit 41 for generating a map of detection levels (and, if necessary, features and types) of high-order patterns and positions thereof, a middle-order pattern consolidation unit 42 for outputting a predicted position (that will be described later) of a middle-order pattern that will be detected and also outputting a category of a high-order pattern having a highest matching degree, a memory 43 for storing data (e.g., template pattern data) representing a category of a high-order pattern, and a primary storage 44 for storing a predicted position (that will be described later) of a middle-order pattern).

The data output from the local area recognition module 3 to the time-sequential consolidation module 4 includes a high-order pattern (such as a face to be finally recognized), information indicating whether there is a middle-order pattern (such as an eye, nose, or a mouth on the face) that can be an element of the high-order pattern, and information indicating the position of the middle-order pattern.

In a case where a middle-order pattern is detected at a scanning position within a local area and no high-order pattern including the detected middle-order pattern is detected in the local area of the input data, (this can occur when the size of the high-order pattern is greater than the size of the local area), there is a possibility that the middle-order pattern will be consolidated via a time-sequential consolidation process performed by the middle-order pattern consolidation unit 42 in order to detect a high-order pattern having a greater size using the consolidated result.

In order to make it possible to detect both a middle-order pattern and a high-order pattern, a signal output from a neuron in the feature consolidation layer 103 (2, m) responsible for middle-order feature detection and signals output from neurons in the final feature consolidation layer 103 (2, M) for giving detection information of a high-order feature (object to be detected) are supplied to the time-sequential consolidation module 4 via a bus line. In particular, a signal output from a neuron in the feature consolidation layer 103 (2, m) is supplied to both the next feature detection layer 102 (1, m+1) and time-sequential consolidation module 4 via the bus line. Transmission among neurons using a pulse signal may be performed using a technique based on, for example, the AER (Address Event Representation) technique (Lazzaro, et al., 1993, Silicon Auditory Processors as Computer Peripherals, In Tourestzky, D. (ed), Advances in Neural Information Processing Systems 5, San Mateo, Calif., Morgan Kaufmann Publishers).

In a case where no high-order pattern is detected (that is, the detection output level of a high-order pattern is lower than a predetermined threshold value) but only a middle-order pattern element is detected, the prediction unit 46 of the time-sequential consolidation module 4 selects one candidate for a high-order pattern that can include the detected middle-order pattern and predicts, using a method that will be described later, a category and a position (arrangement) of other middle-order pattern that will be detected in the candidate for the high-order pattern.

Figure 5:
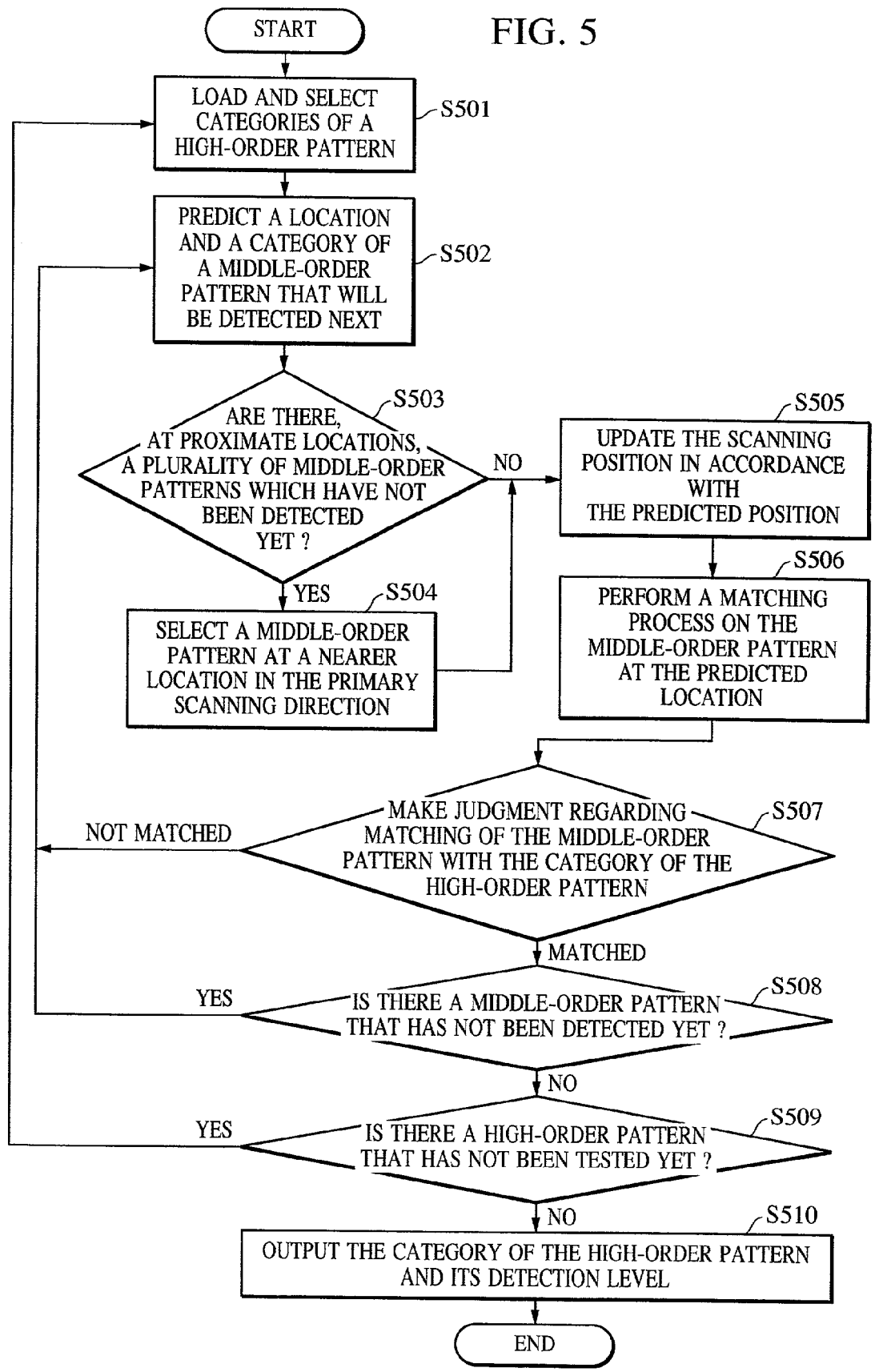
FIG. 5 is a flow chart illustrating a process performed by the time-sequential consolidation module.

The middle-order pattern consolidation unit 42 then outputs, to the judgment unit 5, a signal which has a level depending on whether the pattern of the predicted category will be detected at the predicted position (the output level becomes high if the predicted pattern will be detected at the prediction position) and which thus indicates a detection probability (detection likelihood) that a pattern of the predicted category will be detected. The control unit 6 obtains information indicating the position of the predicted middle-order pattern from the time-sequential consolidation module 4 and outputs a sampling point control signal to the local area scanning unit 1 so that the local area scanning unit 1 can next scan a local area centered at the position of the predicted middle-order pattern. This process will be described in further detail later with reference to FIG. 5.

On the other hand, in a case where the local area recognition module 3 detects, in a local area, a high-order pattern with an output level higher than a predetermined threshold value, the local area recognition module 3 outputs information of the category (detection probability or detection likelihood) and position information of an object detected in that local area to the time-sequential consolidation module 4. The control unit 6 obtains position information of the detected pattern from the local area scanning unit 1 and transfers the position information to the judgment unit 5.

More specifically, if, among the outputs from the feature consolidation layer 103 (2, M) that is the highest layer in the local area recognition module 3, the maximum value of the outputs from neurons of a feature consolidation module belonging to a particular category fNM is greater than a predetermined threshold value, the maximum output of the neuron is supplied, as information indicating the category and position of detected object, to the time-sequential consolidation module 4.

In a case where the local area recognition module 3 detects both a high-order pattern and a middle-order pattern in the same local area (that is, the detection levels of the high-order pattern and the middle-order pattern in the same local area are higher than the predetermined threshold value), the maximum neuron output associated with the high-order pattern is supplied to the high-order pattern map generation unit 41 of the time-sequential consolidation module 4, while, as for the middle-order pattern, the neuron output of the feature consolidation layer 103 (2, m) is supplied to the middle-order pattern consolidation unit 42 via the bus line. Furthermore, in the time-sequential consolidation module 4, the above-described process is performed on both the high-order pattern and the middle-order pattern.

Now, the middle-order pattern consolidation unit 42 of the time-sequential consolidation module 4 is described. The middle-order pattern consolidation unit 42 is a signal processing circuit (so-called middleware) for outputting a predicted category of an undetected middle-order pattern included in a high-order pattern that can include the detected middle-order pattern and also outputting a predicted position thereof near the detected middle-order pattern.

More specifically, on the basis of the class of a specific object (high-order pattern such as a pattern of a face of a human being viewed from front) to be detected and also on the basis of the class of a detected middle-order pattern (a pattern of an element of the object, such as a pattern of an eye), the class of another middle-order pattern (for example, the other eye, a nose, or a mouth), that is, the predicted category and position thereof are determined.

In the present embodiment, for simplification of the circuit configuration, the circuit (prediction unit 46) that performs prediction does not perform a complicated operation associated with stochastic process or the like, rather the circuit is constructed using a logic circuit so as to refer to combinatory list data represented in the form of a dictionary with associated data (indicating the relative position vectors of possible middle-order patterns) and output data.

As shown in FIGS. 6A and 6B, the list data is given in the form of a linked list of middle-order patterns included in a high-order pattern, and associated data represents the distance and direction of each middle-order pattern using relative position vectors.

The predicted position varies depending on the class of the detected middle-order pattern and the type of the processing channel to which the neuron belongs which has the maximum output in the feature consolidation layer 103 (2, m) of the local area recognition module 3. That is, in the present embodiment, the differences in the size of object to be detected and the feature are reflected in the differences in the processing channels. That is, the positions (predicted positions) of middle-order patterns that have not been detected yet vary depending on the size.

The process is now described below for the case in which there are a plurality of high-order patterns to be detected and there is a category of a middle-order pattern that is commonly included in all high-order patterns. In particular, the process performed by the time-sequential consolidation module 4 is described in detail with reference to FIG. 5.

First, in step S501, category information of high-order patterns that can include, as an element thereof, a middle-order pattern detected by the local area recognition module 3 is read from the memory 43 of the time-sequential consolidation module 4.

Then, in step S502, the category and the position of a middle-order pattern having a high probability of being detected next near the already-detected middle-order pattern are determined for each of the high-order patterns and stored in the primary storage 44.

In step S503, it is determined whether there can be a plurality of undetected middle-order patterns near the predicted position. If it is determined that there can be a plurality of such patterns, a pattern that is closer to the predicted position in a principal scanning direction (for example, to the right, or from upper left to bottom right) is selected (S504).

In step S505, output data indicating the predicted position of the pattern selected by the middle-order pattern consolidation unit 42 is input to the control unit 6 and used by the control unit 6 to control the scanning position. In the above process, the control unit 6 converts the predicted position information into position control data to be used by the local area scanning unit 1 to define the position of the local area. The resultant position control data is supplied to the local area scanning unit 1.

Furthermore, in step S506, the output from the middle-order feature consolidation layer 103 (2, m), which indicates the degree of consistency between a detected middle-order pattern and a candidate for a high-order pattern (the degree of consistency is determined one by one for all high-order pattern candidates), is supplied to the middle-order pattern consolidation unit 42 from the local area recognition module 3.

After the scanning position has been changed, the middle-order pattern consolidation unit 42 of the time-sequential consolidation module 4 acquires, under the control of the scanning unit 1, the recognition result of the local area data (that is the same as that selected in step S504) from the local recognition module 3 and judges the matching with the category of the already-detected middle-order pattern (S507) as described below. In the case where the judgment indicates that the matching is good, it is checked that there is a middle-order pattern which has not been detected yet (S508) and the flow returns to the step S502 if there is. In step S509, the flow returns to the step S501 if there is a high-order pattern which has not been tested yet. Accordingly, the above-described prediction and judgment at the middle-order pattern level is performed repeatedly as long as there is a middle-order pattern that has not been detected yet. Finally, information indicating the category of the high-order pattern judged as having a high degree of matching and the detection level (indicating the detection probability or the detection likelihood) thereof are output to the judgment unit 5 (S510).

The judgment regarding the degree of matching of the middle-order pattern on the basis of the category of the high-order pattern (step S507) is described below. If category-to-configuration correspondence of remaining middle-order patterns that match the category of the high-order pattern and the category of the already-detected middle-order pattern are stored in advance in the form of a table in a memory, it is possible to make judgment by means of a simple logic decision process using a simple logic circuit.

An example of data indicating the correspondence is shown in FIG. 6A. Herein, the data indicating the correspondence is given in the form of a table. In this specific example, "face" is given as the category of a high-order pattern, and "eye" is given as the category of a first-detected middle-order pattern. Herein, if a middle-order pattern size is given by a channel number k (scale level k) of a middle-order pattern feature consolidation layer 103 (2, m), the categories and positions of remaining middle-order patterns that match "face" and "eye" are given as "nose" and $r_{e-n,k}$, "mouth" and $r_{e-m,k}$, and "eye" and $r_{e-e1,k}$ and $r_{e-e2,k}$. Herein, r denotes a relative position vector with respect to the already-detected middle-order pattern.

There are two position vectors for the remaining "eye", because it is impossible, at this stage, to determine whether the detected eye is a right eye or a left eye. It becomes possible to determine whether the detected eye is a right eye or left eye when a pattern corresponding to the remaining eye is detected. In a case where two or more middle-order patterns such as "eye" and "nose" have been already detected, the relative position vectors of remaining middle-order patterns such as "mouth" can be uniquely determined.

FIGS. 6B-1 to 6B-4 illustrate the process of detecting middle-order patterns for a case where a certain middle-order pattern (for example, an eye) included in a high-order pattern (face) is first detected and then other middle-order patterns (eye, nose, and mouth) represented in the form of a tree in FIGS. 6B-1 to 6B-4 are detected. In FIGS. 6B-1 to 6B-4, nodes represented by open circles denote those which have not been detected yet, and nodes represented by solid circles denote those which have already been detected. Eye-1 and eye-2 denote left and right eyes, respectively. In a case where scanning is performed sequentially from left to right to detect pattern categories shown in FIGS. 6B-1, the detection state changes from (1) through (4) in FIG. 6B. In this example, it is assumed that one eye, that is, eye-2, is detected at a predicted position.

Judgment

Figure 7:
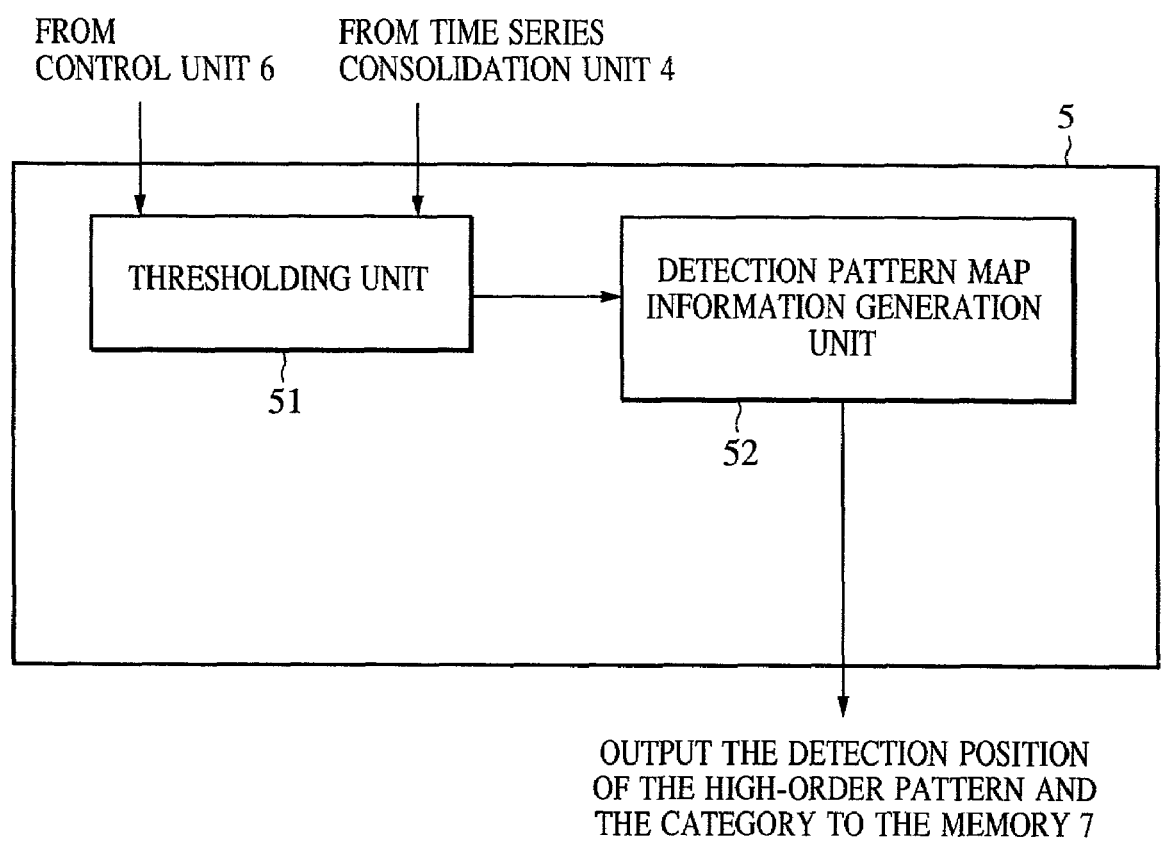
FIG. 7 is a diagram illustrating a judgment unit.

The construction of the judgment unit 5 is described below with reference to FIG. 7. The judgment unit 5 includes a thresholding unit 51 and a detection pattern map information generation unit 52. The thresholding unit 51 performs a thresholding process on the detection level signal of a high-order pattern supplied from the time-sequential consolidation module 4. In the case where the threshold value depends on the input data (object to be detected), threshold information is supplied from the control unit 6. If the detection level signal supplied from the time-sequential consolidation unit 4 is higher than the threshold value, the detection pattern map information generation unit 52 stores information indicating the category and position of the high-order pattern into the memory 7 in which detected pattern map information associated with the entire input data is stored. Alternatively, the information may be supplied to a predetermined display.

The above-described construction makes it possible to detect the position of a pattern of a specific category from input data (image) using a simple circuit configuration.

Furthermore, because the recognition circuit deals with only part of the input data and is capable of detecting both middle-order and high-order patterns, a great reduction in circuit complexity and a greater improvement in efficiency are achieved, compared with the construction in which a plurality of features at a plurality of positions in the input data are detected simultaneously and in parallel.

The pattern recognition apparatus described above may be disposed on an image inputting device such as a camera or on image outputting device such as a printer or a display. In a case where the pattern recognition apparatus is disposed on an image inputting device, it becomes possible to recognize or detect a specific object and perform focusing, exposure adjustment, zooming, color correction, and/or other processing with respect to an area centered at the detected object, using a small-scale circuit having low power consumption. If the pattern recognition apparatus is disposed on an image outputting device, it becomes possible to automatically perform optimum color correction for a specific subject.

The pattern detection (recognition) apparatus according to the present embodiment may be disposed on an imaging apparatus to perform focusing of a specific subject, color correction of a specific subject, and exposure adjustment for a specific subject, as described below with reference to FIG. 13, which illustrates main parts of the imaging apparatus including the pattern recognition apparatus according to the present embodiment.

Figure 13:
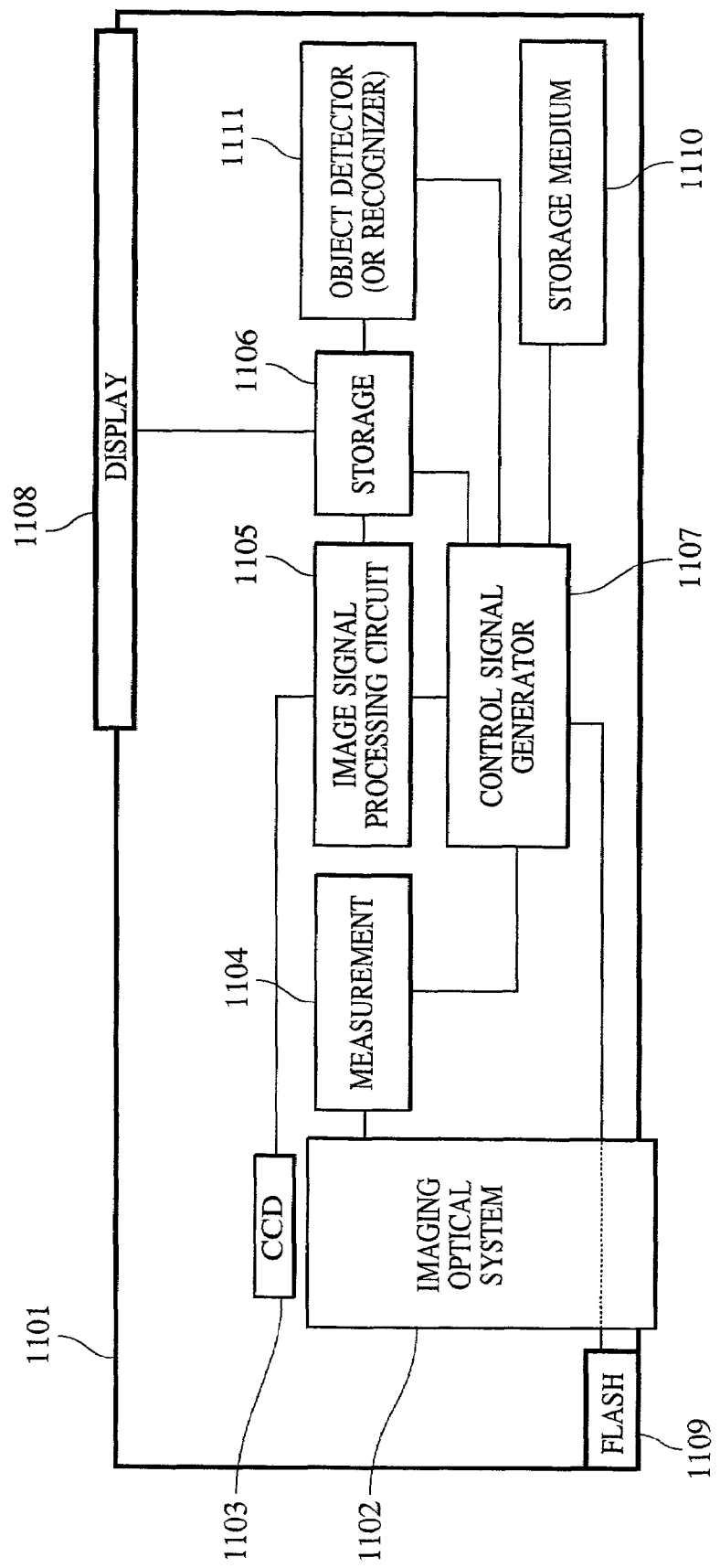
FIG. 13 is a diagram illustrating main parts of a imaging apparatus that is an example of an apparatus using a pattern recognition apparatus.

As shown in FIG. 13, the imaging apparatus 1101 includes an imaging optical system 1102 including an imaging lens and a zooming mechanism, a CCD or CMOS image sensor 1103, an imaging parameter measuring unit 1104, an image signal processing circuit 1105, a storage unit 1106, a control signal generator 1107 for generating a control signal for controlling an operation of taking an image and controlling an imaging condition, a display 1108 also serving as a viewfinder such as an EVF, a flash lamp 1109, and a storage medium 1110. Furthermore, a pattern recognition apparatus capable of performing time division multiplexing processing is provided as an object detection (recognition) apparatus 1111.

In this imaging apparatus 1101, a face image of a person, registered in advance, is detected (in terms of the position and the size) from an image being taken, using the object detection (recognition) apparatus 1111. Information about the position and the size of the person image is supplied from the object detection (recognition) apparatus 1111 to the control signal generator 1107. In response, the control signal generator 1107 generates a control signal on the basis of the output from the imaging parameter measuring unit 1104 to properly control the focus, the exposure, and the white balance with respect to the image of that person.

By using the pattern detection (recognition) apparatus in the imaging apparatus in the above described manner, it becomes possible to detect an image of a person and properly control the imaging conditions for the detected image at a high speed (in real time) using a small-sized circuit having low power consumption.

Second Embodiment

In this second embodiment, the sampling point position scanned by the local area scanning unit 1 is changed in accordance with a predetermined procedure (raster scanning procedure), and the block size is fixed (based on the predetermined maximum size of an object to be detected). Thus, in the present embodiment, the controlling of the sampling point position during the process does not depend on the output from the local area recognition module 3. As in the previous embodiment, the local area recognition module 3 detects a middle-order or high-order pattern. The construction of the pattern recognition apparatus is similar to that according to the first embodiment.

Of course, high-order patterns to be detected should have a size smaller than the block size. Scanning is performed over the entire input data without changing the block size. As in the first embodiment, the local area recognition module 3 includes processing channels assigned to different object sizes to detect an object for various different sizes.

Figure 8:
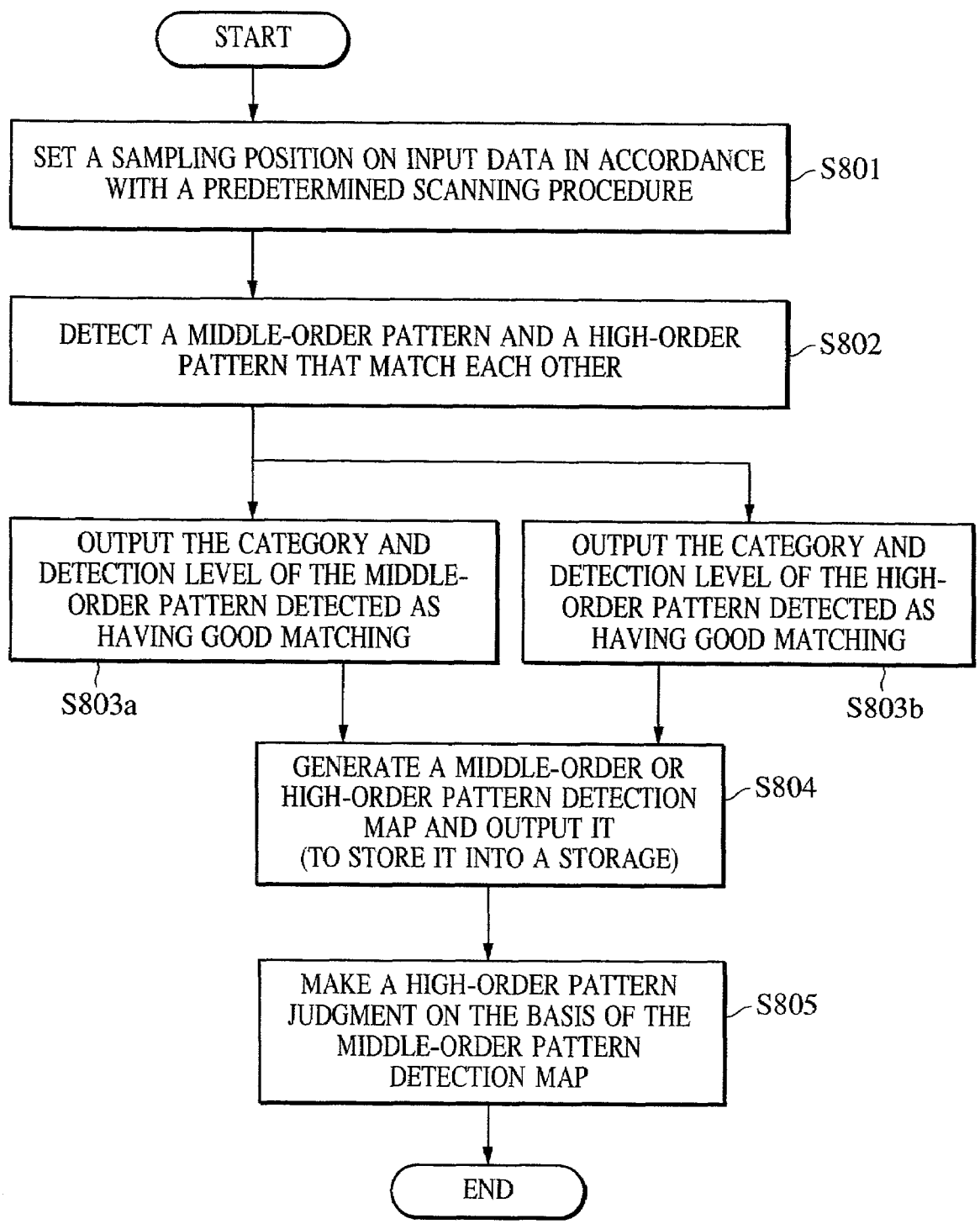
FIG. 8 is a flow chart illustrating a main process according to a second embodiment.

FIG. 8 is a flow chart of a process according to the present embodiment. First, in step S801, the position of a sampling point on input data is set in accordance with a predetermined scanning procedure. In the next step S802, a middle-order pattern at the sampling point position is examined to determine whether it matches a high-order pattern. That is, a middle-order pattern and a corresponding high-order pattern that matches the middle-order pattern are detected.

In the above scanning process, if the detection level of a middle-order or high-order pattern is higher than a predetermined threshold value, then in steps S803a and S803b, the local area recognition unit 3 outputs the detection level (maximum neuron output level of those in the feature consolidation layer) of the middle-order or high-order pattern detected in the scanning process. In step S804, the time-sequential consolidation unit 4 stores, into the primary storage 44, detection pattern distribution (map) information, the category, the detection level, and the position of the pattern each time such a pattern is detected.

Herein, the stored middle-order pattern data is part of a high-order pattern having a size (greater than the block size) that cannot be detected in a local area with a given size.

After completion of changing the scanning position over the entire input data, the judgment unit 5 checks the data stored in the primary storage 44 of the time-sequential consolidation unit 4 to judge whether an object image (high-order pattern) is present in an area around the position where the middle-order pattern has been detected (the high-order pattern including that middle-order pattern cannot be detected at the position where the middle-order pattern is detected because of the limitation of the block size). If the high-order pattern (object to be detected) is determined to be present, the position and the category thereof are determined (step S805).

Figure 14:
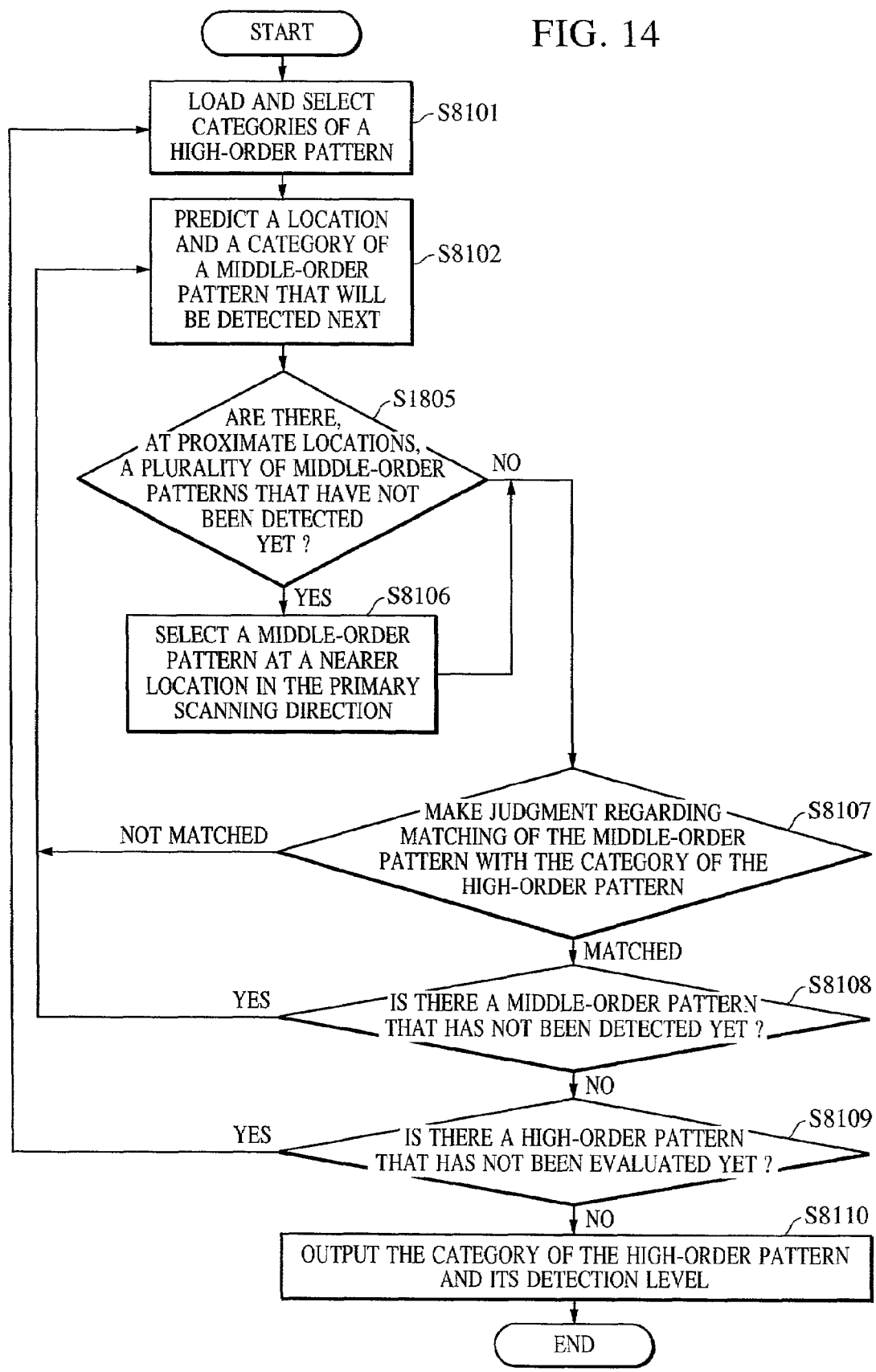
FIG. 14 is a flow chart illustrating a process of judging a high-order pattern according to the second embodiment.

Unlike the previous embodiment, the process in step S805 is not a simple thresholding process. As shown in FIG. 14, the process performed in step S805 is basically the same as the process performed by the time-sequential consolidation unit 4 in the first embodiment described above. That is, the process is performed as described below while scanning the detection map associated with a middle-order pattern stored in the primary storage 44.

First, in step S8101, high-order pattern categories are input and one of them is selected. Thereafter, in step S8102, a next predicted position to jump to in the scanning of the detection map is determined. A category of a feature predicted to be present at that position is also determined. When a plurality of middle-order patterns included in the high-order pattern can be present near each other, the process is performed (steps S8105 and S8106) in a similar manner to the process performed in steps S505 and S506 by the time-sequential consolidation unit 4 according to the first embodiment described earlier with reference to FIG. 5.

Furthermore, matching between the middle-order pattern at the predicted position and the high-order pattern is evaluated by performing a simple logical decision (step S8107). Thereafter, the process from step S8101 to step S8107 is performed repeatedly until it is determined in steps S8108 and S8109 that there are no more middle-order patterns that have not been detected yet and there are no more high-order patterns that have not been evaluated yet. After that, map information associated with a detected high-order pattern is output as a final result (S8110).

In step S8110 described above, a combination of middle-order patterns which match (in terms of the arrangement) the one of prepared high-order patterns is extracted, and information about the type of the high-order pattern and the position thereof is output.

When a high-order pattern is detected at a particular position, the judgment described above is not necessary and thus is not performed.

Third Embodiment

In this third embodiment, the size of the block-shaped local area defined by the scanning unit 1 is controlled by a block setting unit (not shown), and consolidation and recognition are performed by the local area recognition module 3, the time-sequential consolidation module 4, and the judgment unit 5. As in the first embodiment, the local area recognition module 3 includes a plurality of parallel processing channels corresponding to different scale levels. The block size may be updated according to one of two methods described below. In the first method, the control unit 6 determines the block size at each scanning position, and the local area recognition module 3 outputs data at each scanning position. In the second method, consolidation and recognition are performed by scanning the entire input data while fixing the block size. Thereafter, the block size is changed and consolidation and recognition are performed for the updated block size.

In the second method, in many cases, a pattern can be efficiently detected if the block size is sequentially reduced in the subsequent processes. In any case, the local area recognition module 3 detects only a high-order pattern, and thus the data supplied to the time-sequential consolidation unit 4 is output only from the highest-level feature consolidation layer. Except for the above, the process performed by the recognition module 3 is similar to that according to the previous embodiments.

Figure 9:
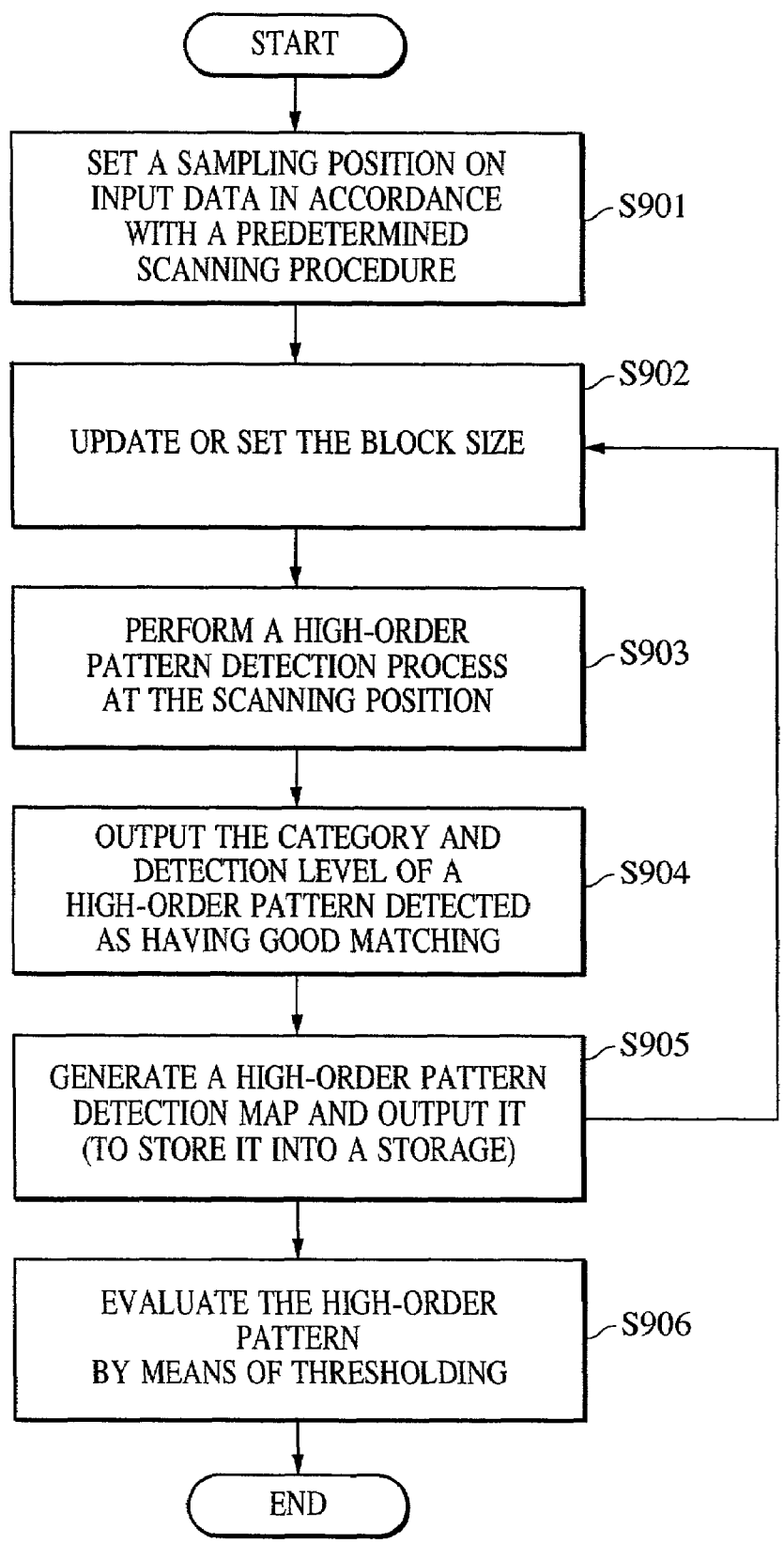
FIG. 9 is a flow chart illustrating a main process according to a third embodiment.

FIG. 9 is a flow chart of a main process according to the present embodiment. First, in step S901, the sampling point position in the input data is determined in accordance with a predetermined scanning procedure. Then in step S902, setting or changing of the block size is performed in accordance with a predetermined procedure (as described above). In step S903, the local area recognition module 3 detects a high-order pattern in a local area. In the following step S904, the detection level of a pattern that matches a prepared high-order pattern is output. In step S905, the detection level and the category of the high-order pattern are supplied from the local area recognition module 3 to the time-sequential consolidation module 4. Furthermore, corresponding scanning position information is supplied from the control unit 6 to the time-sequential consolidation module 4. The time-sequential consolidation module 4 generates a high-order pattern detection map and outputs it (to store it into the storage). Finally, the judgment unit 5 performs a thresholding process (S906) and outputs data indicating the position of the high-order pattern (to be detected) in the input data.

The difference in the block-shaped local area in the scanning process corresponds to the difference in the processing channel of the local area recognition module 3 described above with reference to the first embodiment. That is, a high-order pattern is detected at respective scanning positions for various sizes.

In the present embodiment, as described above, only a high-order pattern in a local area is detected by scanning the input data while controlling the block size in accordance with the predetermined procedure. This makes it possible to construct the respective modules (such as the local area recognition module 3, the time-sequential consolidation module 4, and the judgment unit 5) in a simplified fashion and minimize the power consumption.

Fourth Embodiment

Figure 10:
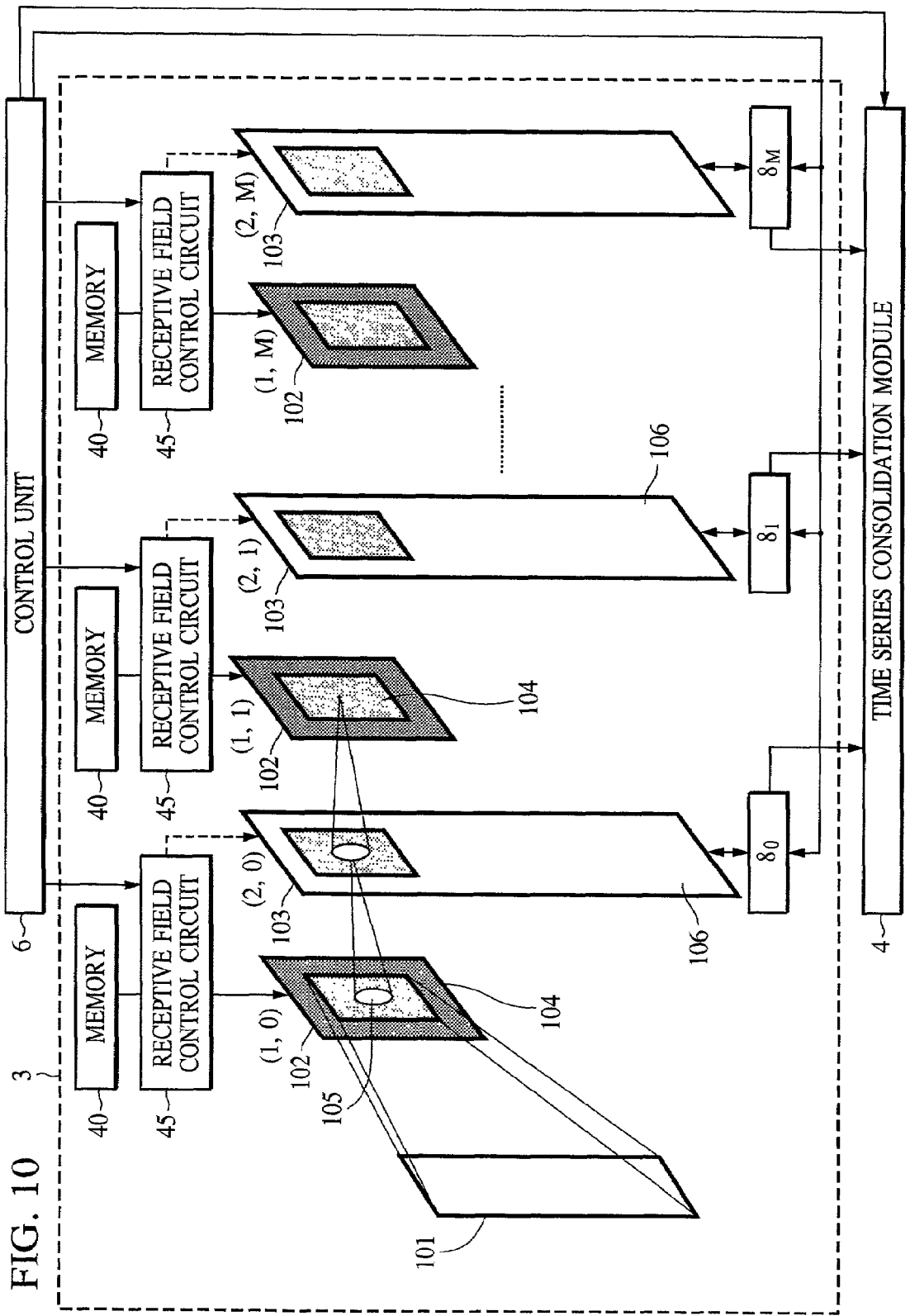
FIG. 10 is a diagram illustrating main parts of a fourth embodiment.

FIG. 10 is a diagram illustrating main parts of a fourth embodiment. In this embodiment, only one type of feature (category or size) is detected at a time in each feature detection layer, and the feature type is time-sequentially changed by the control unit 6. Therefore, the number s of feature types that are arranged in parallel in each layer of the local area recognition module 3 becomes greatly smaller (s=1 allowed) than the number N of feature types in the first embodiment.

That is, for the same local area in the input data supplied from the local area scanning unit 1, the local area recognition module 3 detects patterns of various different categories by time-sequentially changing the category during the detection process. In this pattern detection process, intermediate results obtained at respective sampling points of the input data are stored in memories $8_0, 8_1, \ldots, 8_M$, and then the intermediate detection results of the respective feature consolidation layers are read from the memories $8_0, 8_1, \ldots, 8_M$ and consolidated by the time-sequential consolidation module 4.

As in the previous embodiments, the local area recognition module 3 hierarchically detects patterns of various orders from low to high using feature detection layers 102 and feature consolidation layers 103 alternately disposed in a cascade arrangement.

Outputs from the respective feature detection layers 102 are sub-sampled by the feature consolidation layers 103 at respective stages as in the previous embodiments, and the results are temporarily stored in memories $8_0, 8_1, \ldots, 8_M$ associated with the respective feature consolidation layers (103) such that different types are stored at different memory addresses. Furthermore, in the feature detection layers 102, as described below, the synapse weight distribution (local receptive field structure) is changed, and the detection results for the respective feature types are time-sequentially input from the memory 8. For example, when a pattern of an eye (middle-order pattern) is detected, the local receptive field structure of the feature detection layer 102 is formed such that local receptive field structures corresponding to respective low-order patterns P1, P2, . . . , Pn, which are needed to detect the middle-order pattern, are provided each time output from the feature consolidation layer corresponding to a pattern Pk (k=1, . . . , n) is input from the memory 8.

The local receptive field structures of the feature detection layer 102 are retained in the form of digital data in a memory such as an SRAM 40 for each feature type, and the local receptive field structures are changed as required in accordance with the data stored in the memory 40. More specifically, the local receptive field structures can be realized using a dynamically reconfigurable FPGA and using a receptive field control circuit 45 for controlling associated synapse circuit elements.

For example, the receptive field structure of neurons in a feature detection layer 102 that detects a pattern of an eye at a certain time is changed at another time in accordance with a signal from the control unit 6 and the receptive field control circuit 45 so as to detect another pattern such as a nose or mouth pattern.

In the present embodiment, as described above, when input data is given part by part, different features are detected (recognized) by performing the time division multiplexing process in the local area recognition module 3, thereby achieving a great reduction in circuit complexity compared with the circuit which simultaneously detects a plurality of features at the plurality of sampling positions in the input data by means of parallel operations.

The receptive field structure is determined by data called configuration bits of the FPGA stored in an SRAM (not shown). Thus, the receptive field structure is time-sequentially changed by the receptive field control circuit 45 by dynamically changing the configuration of the FPGA, that is, by changing the configuration bits stored in the FPGA in accordance with data stored in the memory 40. That is, the configuration bits serve as data that determines the receptive field structure.

In general, to realize a neural network including neurons having a local receptive field structure, a memory and a control circuit are needed to change the configuration bits for respective neurons. The neural network for the local area recognition module 3 according to the first embodiment described earlier can be realized using one set of configuration bits for each feature detection layer, the memory 40, and the receptive field control circuit 45, as described below.

If the feature which is to be detected at respective sampling points at a time by the detection layer 102 is limited to one type (feature category or size), the local receptive fields of the neurons in the feature detection layer become the same. As a result, it becomes possible to commonly use the memory 40 and the receptive field control circuit 45 to determine the structure of all local receptive fields. That is, it is possible to time-sequentially change the configuration bits of the respective neurons in the feature detection layers in a simple fashion.

In general, the configuration bits determine only the structure of the logical connections (interconnections). That is, the presence/absence of connection between a neuron and another neuron in a layer at a preceding stage is specified by a configuration bit. The weight value associated with each connection is set and changed so as to achieve the receptive field structure by setting and changing the weight data of the synapse circuit in accordance with the weighting data supplied from the memory 40.

For example, in a case where the synaptic weight is given by the amount of charge injected in a floating gate element or stored in a capacitor, the synaptic weight for each synaptic is set and changed by injecting as much amount of charge as specified by the weight data stored in the memory 40. More specifically, the receptive field control circuit 45 reads the synaptic weight data (indicating the voltage to be applied to inject a required amount of charge) from the memory 40 at a specified address, and the receptive field control circuit 45 injects a current into a floating gate element until the specified amount of charge is stored (until the specified voltage is obtained).

Similarly, the synapse circuit elements $S_k$ (k=1, 2, . . . ) that constitute the receptive field structure are time-sequentially accessed, and charges (hot electrons) are injected by applying a voltage thereto thereby setting the distribution of synaptic weight (receptive field structure). Alternatively, it is possible to use a memory device to store data corresponding to the weights, if the data can be rewritten quickly enough and if the data can be retained for a period of time as long as required in that device.

The receptive field structures of respective neurons in the feature detection layer are changed depending on the feature type. However, if the scale level, which is one of the feature types, is not changed, the receptive field structures of neurons in the feature consolidation layer are not changed. Note that specific values of the configuration bits are different from one neuron to another to reflect the difference in the actual interconnection (address) depending on the locations of the neurons in the respective feature detection layers.

Fifth Embodiment

In this fifth embodiment, a synapse circuit with a receptive field structure is realized using a 2-dimensional systolic array processor, and the receptive field structure is changed by changing the time-sequential data supplied to the systolic array elements to control pipeline processing (description of the systolic array can be found, for example, in "Parallel Computer Architecture" by Tomita (Shokodo, pp. 190-192, 1986), "Digital Neural Networks" by S. Y. Kung (PTR Prentice Hall, Englewood Clifs, pp. 340-361, 1993), and Japanese Examined Patent Application Publication No. 2741793).

Figure 11:
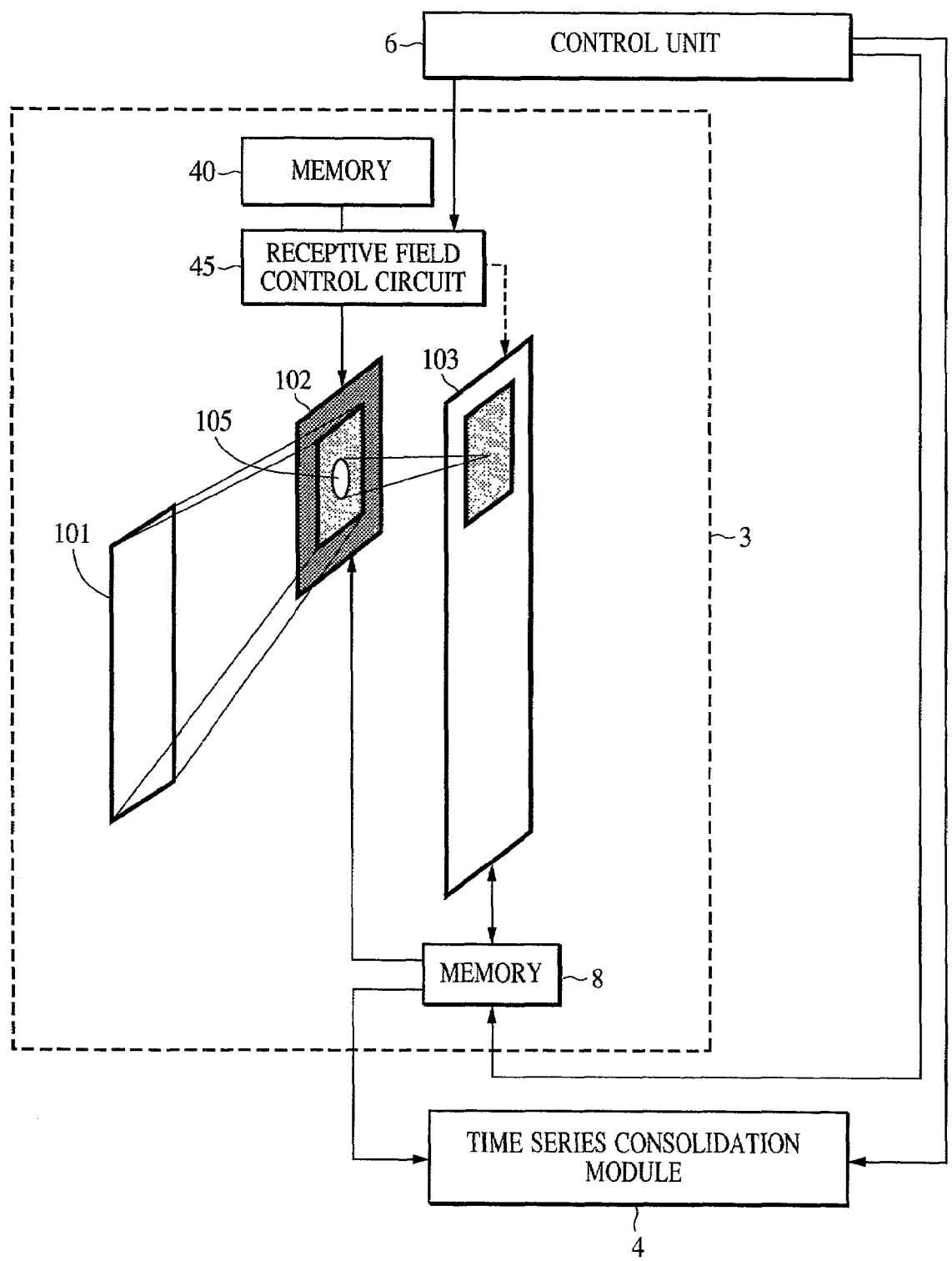
FIG. 11 is a diagram illustrating main parts of a fifth embodiment.

FIG. 11 is a diagram illustrating main parts of the fifth embodiment. The synaptic weight data stored in a memory 40 is time-sequentially supplied to respective synapse circuit elements arranged in a systolic array structure in the feature detection layer 102 and the feature consolidation layer 103 thereby controlling the local receptive field structure dynamically and time-sequentially. The synaptic weight may be given, for example, by the amount of charge injected in a floating gate element or stored in a capacitor. In this case, the respective synapse circuit elements Sk are sequentially accessed, and voltage signals corresponding to the weight data read from the memory 40 are applied to the synapse circuit elements Sk, as in the fourth embodiment described above. As can be seen from comparison between the structure shown in FIG. 11 and that shown in FIG. 10, drastic simplification in the circuit configuration is achieved.

The outputs from the local area recognition module 3 (outputs from the feature consolidation layers) are consolidated by the consolidation module 4 in synchronization with the timing control signal of the systolic array processor supplied from the control unit 6, and the judgment unit 5 judges whether there is an object of the specified category. The processes performed by the time-sequential consolidation module 4 and the judgment unit 5 are substantially the same as those described earlier in the first embodiment, and thus they are not described herein.

Figure 12:
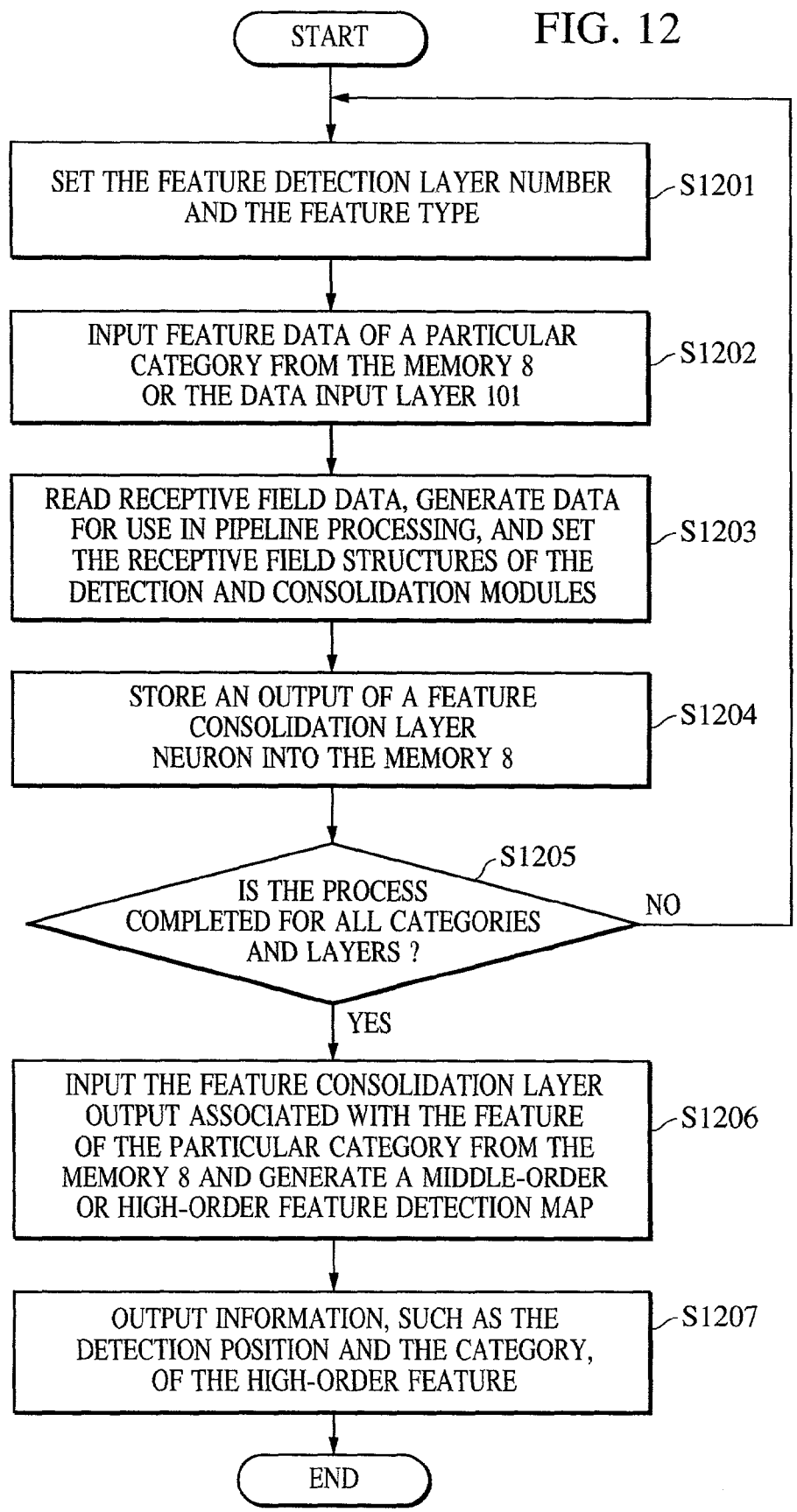
FIG. 12 is a flow chart illustrating a main process according to a fifth embodiment.

FIG. 12 is a flow chart illustrating a main process according to the present embodiment. First, in step S1201, the control unit 6 sets feature detection layer numbers (of various orders from low to high) and feature types (categories and sizes) in the respective layers. This setting process is performed in accordance with a predetermined procedure.

In the following steps S1202 and S1203, feature data or image data of a specific category with weights depending on the receptive field structure is input to detection modules in the feature detection layer from the memory 8 or the data inputting layer 101. In step S1203, the receptive field control circuit 45 time-sequentially sets the receptive field structure using pipeline data. As in the previous embodiment, the receptive field structures of respective neurons in the feature detection layer are changed depending on the feature type. However, if the scale level, which is one of the feature types, is not changed, the receptive field structures of neurons in the feature consolidation layer are not changed.

In step S1204, the outputs from the feature detection layers are sub-sampled (in the feature consolidation layer) for respective feature types, and the results are stored in the memory 8 at different addresses depending on the feature type. The process from step S1201 to step S1204 is performed repeatedly for respective feature categories and layer numbers. If it is determined in step S1205 that the process is completed for all feature categories and layer numbers, the process proceeds to step S1206. In step S1206, the time-sequential consolidation module 4 reads the detection results associated with the respective feature types from the memory 8 and produces a detection map of middle-order or high-order features. In step S1207, the judgment unit 5 performs a thresholding process to finally determine whether an object of the specified category is present. If such an object is present, the judgment unit 5 outputs information indicating the position thereof.

In the present invention, as described above in detail with reference to specific embodiments, a plurality of features are detected in local areas while scanning input data, and the plurality of features detected in the local areas are integrated to finally detect (recognize) a pattern of a specific category with a specific size. This makes it possible to detect (recognize) a pattern in a highly efficient manner using a very simple circuit.

Furthermore, the present invention makes it possible to efficiently extract local features (patterns) of specific categories for various different sizes, using a small-scale circuit.

Furthermore, consolidation of local patterns extracted (detected) at different positions can be easily performed using a simple logic circuit by referring to data representing, in the form of a list with associated data, the configurations of middle-order patterns. This makes it possible to quickly detect a high-order pattern.

Furthermore, even when an object is partially occluded by another object, the object can be detected in a highly reliable fashion by detecting low-order patterns or middle-order patterns on the basis of the output from the sensor and integrating them.

Furthermore, the circuit complexity can be greatly reduced by changing the receptive field structure depending on the type of feature to be detected.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A pattern recognition apparatus comprising:
    data inputting means for inputting image data by time-sequentially inputting blocks of the image data, each of the blocks being a predetermined size;
    position information inputting means for inputting position information representing a position of each of the blocks in the input image data;
    pattern detection means for detecting a low-order feature pattern of a predetermined category from each block of the input image data;

prediction means for predicting a category and a position of a first low-order feature pattern to be detected on the basis of a second low-order feature pattern which has been detected;

time-sequential consolidation means for time-sequentially consolidating low-order feature patterns detected from a plurality of blocks of the input image data by said pattern detection means on the basis of the position information input by said position information inputting means and the category of each detected feature pattern, the consolidated low-order feature patterns forming a high-order feature pattern, said time-sequential consolidation means comparing a category of the first low-order feature pattern detected at the predicted position with the predicted category and determining the likelihood of presence of the high-order feature pattern formed by the first low-order feature pattern on the basis of a result of the comparison; and judgment means for judging a position and a category of a high-order feature pattern present in the input image data, on the basis of the output from said time-sequential consolidation means.

2. A pattern recognition apparatus according to claim 1, wherein said pattern detection means or said time-sequential consolidation means includes storage means for storing a process result.

3. A pattern recognition apparatus according to claim 2, further comprising size changing means for changing the size of the blocks of pattern data, where said judgment means makes judgment on the basis of results of consolidation for different block sizes.

4. A pattern recognition apparatus according to claim 2, wherein said pattern detection means includes an operation element for detecting geometrical features with different sizes in the blocks of pattern data.

5. A pattern recognition apparatus according to claim 1, wherein said data inputting means inputs the blocks of pattern data having a predetermined size by scanning input data.

6. A pattern recognition apparatus according to claim 5, further comprising scanning control means for changing a scanning position of said data inputting means on the basis of the likelihood of presence of a high-order pattern to be detected, determined by said time-sequential consolidation means.

7. A pattern recognition apparatus according to claim 1, further comprising control means for time-sequentially changing an operation characteristic of the operation element of said pattern detection means.

8. A pattern recognition apparatus according to claim 1, wherein said pattern detection means extracts a predetermined local feature at each position in the data.

9. A pattern recognition apparatus according to claim 8, wherein said time-sequential consolidation means stores a detection result of a local feature together with associated position information into a predetermined primary storage means.

10. A pattern recognition apparatus according to claim 1, wherein said pattern detection means is parallel processing means including a plurality of operation elements arranged in parallel and connected to each other.

11. A pattern recognition apparatus according to claim 1, wherein the operation element of said pattern detection means is constructed such that a plurality of feature detection layers and a plurality of feature consolidation layers are alternately disposed and connected in a cascading fashion.

12. A pattern recognition apparatus according to claim 1, wherein said pattern detection means has the predetermined operation characteristic, said time-sequential consolidation means consolidates the outputs, associated with patterns at a plurality of scanning positions, from said pattern detection means, and said judgment means outputs information indicating the position, in the input data, of a pattern of a specified category, together with information indicating the category.

13. A pattern recognition apparatus according to claim 1, wherein said time-sequential consolidation means consolidates patterns detected at scanning positions on the basis of the position information, and said judgment means judges whether there is a high-order pattern including the detected patterns.

14. A pattern recognition apparatus according to claim 1, further comprising control means for controlling the operation characteristic of said pattern detection means so that patterns of different categories with different sizes can be detected in the input pattern data.

15. A pattern recognition apparatus according to claim 1, wherein the detection map information is information about a position of the pattern and at least one of a type and a detection level of the pattern.

16. An image processing apparatus which controls a process performed on a signal of an image in accordance with a signal which is output, after being processed by a pattern recognition apparatus according to claim 1, from said pattern recognition apparatus.

17. A pattern recognition apparatus comprising:

data inputting means for inputting image data by scanning the image data of a predetermined size at a plurality of scanning positions;

detection means for detecting a predetermined feature from each of the scanned image data;

prediction means for predicting a category and a position of first scanned image data to be detected on the basis of second scanned image data which has been detected;

scanning position changing means for changing, a scanning position at which the image data is scanned by said data inputting means to the position predicted by said prediction means;

consolidation means for consolidating a plurality of features detected at different scanning positions on the basis of the scanning position of each detected feature, said consolidation means comparing a category of the first scanned image data detected at the predicted position with the predicted category and determining, on the basis of the result, the likelihood of presence of a specific pattern formed by the first scanned image data; and judgment means for judging the position and the type of the specific pattern, on the basis of the output from said consolidation means.

18. A pattern recognition apparatus comprising:

a data inputting unit for inputting image data by time-sequentially inputting blocks of the image data, each of the blocks being a predetermined size;

a position information inputting unit for inputting position information representing a position of each of the blocks in the input image data;

a pattern detection for detecting a low-order feature pattern of a predetermined category from each block of the input image data;

a prediction unit for predicting a category and a position of a first low-order feature pattern to be detected on the basis of a second low-order feature pattern which has been detected;

a time-sequential consolidation unit for time-sequentially consolidating low-order feature patterns detected from a plurality of blocks of the input image data detected by said pattern detection unit on the basis of the position information input by said position information inputting unit and the category of each detected feature pattern, the consolidated low-order feature patterns forming a high-order feature pattern, said time-sequential consolidation unit comparing a category of the first low-order feature pattern detected at the predicted position with the predicted category and determining the likelihood of presence of the high-order feature pattern formed by the first low-order feature pattern on the basis of a result of the comparison; and a judgment unit for judging a position and a category of a high-order feature pattern present in the input image data, on the basis of the output from said time-sequential consolidation unit.

19. A pattern recognition apparatus according to claim 18, wherein said pattern detection unit or said time-sequential consolidation unit includes storage means for storing a process result.

20. A pattern recognition apparatus according to claim 19, further comprising a size changing unit for changing the size of the blocks of pattern data, where said judgment unit makes judgment on the basis of results of consolidation for different block sizes.

21. A pattern recognition apparatus according to claim 19, wherein said pattern detection unit includes an operation element for detecting geometrical features with different sizes in the blocks of pattern data.

22. A pattern recognition apparatus according to claim 18, wherein said data inputting unit inputs the blocks of pattern data having a predetermined size by scanning input data.

23. A pattern recognition apparatus according to claim 22, further comprising a scanning control unit for changing a scanning position of said data inputting unit on the basis of the likelihood of presence of a high-order pattern to be detected, determined by said time-sequential consolidation unit.

24. A pattern recognition apparatus according to claim 18, further comprising a control unit for time-sequentially changing an operation characteristic of the operation element of said pattern detection unit.

25. A pattern recognition apparatus according to claim 18, wherein said pattern detection unit extracts a predetermined local feature at each position in the data.

26. A pattern recognition apparatus according to claim 25, wherein said time-sequential consolidation unit stores a detection result of a local feature together with associated position information into a predetermined primary storage unit.

27. A pattern recognition apparatus according to claim 18, wherein said pattern detection unit is parallel processing unit including a plurality of operation elements arranged in parallel and connected to each other.

28. A pattern recognition apparatus according to claim 18, wherein the operation element of said pattern detection unit is constructed such that a plurality of feature detection layers and a plurality of feature consolidation layers are alternately disposed and connected in a cascading fashion.

29. A pattern recognition apparatus according to claim 18, wherein said pattern detection unit has the predetermined operation characteristic, said time-sequential consolidation unit consolidates the outputs, associated with patterns at a plurality of scanning positions, from said pattern detection unit, and said judgment unit outputs information indicating the position, in the input data, of a pattern of a specified category, together with information indicating the category.

30. A pattern recognition apparatus according to claim 18, wherein said time-sequential consolidation unit consolidates patterns detected at scanning positions on the basis of the position information, and said judgment unit judges whether there is a high-order pattern including the detected patterns.

31. A pattern recognition apparatus according to claim 18, further comprising a control unit for controlling the operation characteristic of said pattern detection unit so that patterns of different categories with different sizes can be detected in the input pattern data.

32. A pattern recognition apparatus according to claim 18, wherein the detection map information is information about a position of the pattern and at least one of a type and a detection level of the pattern.

33. An image processing apparatus which controls a process performed on a signal of an image in accordance with a signal which is output, after being processed by a pattern recognition apparatus according to claim 18, from said pattern recognition apparatus.

34. A pattern recognition apparatus comprising:

a data inputting unit for inputting image data by scanning the image data of a predetermined size at a plurality of scanning positions;

a detection unit for detecting a predetermined feature from each of the scanned image data;

a prediction unit for predicting a category and a position of first scanned image data to be detected on the basis of second scanned image data which has been detected;

a scanning position changing unit for changing a scanning position at which the image data is scanned by said data inputting unit to the position predicted by said prediction means;

a consolidation unit for consolidating a plurality of features detected at different scanning positions on the basis of the scanning position of each detected feature, said consolidation unit comparing a category of the first scanned image data detected at the predicted position with the predicted category and determining, on the basis of the result, the likelihood of presence of a specific pattern formed by the first scanned image data; and a judgment unit for judging the position and the type of the specific pattern, on the basis of the output from said consolidation unit.

35. A pattern recognition method comprising the steps of:

time-sequentially inputting blocks of the image data, each of the blocks being a predetermined size;

inputting position information representing a position of each of the blocks in the input image data;

detecting a low-order feature pattern of a predetermined category from each block of the input image data;

predicting a category and a position of a first low-order feature pattern to be detected on the basis of a second low-order feature pattern which has been detected;

consolidating low-order feature patterns detected from for a plurality of blocks of the input image data by said pattern detection step on the basis of the position information input in said position information inputting step and the category of each detected feature pattern, said consolidating step comparing a category of the first low-order feature pattern detected at the predicted position with the predicted category and determining the likelihood of presence of the high-order feature pattern formed by the first low-order feature pattern on the basis of a result of the comparison; and judging a position and a category of a high-order feature pattern present in the input image data, on the basis of the output in said consolidation step.

36. A pattern recognition method according to claim 35, wherein said detection step or said consolidation step includes storing a process result.

37. A pattern recognition method according to claim 36, further comprising a step of changing the size of the blocks of pattern data, where said outputting step outputs information on the basis of results of consolidation for different block sizes.

38. A pattern recognition method according to claim 36, wherein said detection step includes detecting geometrical features with different sizes in the blocks of pattern data.

39. A pattern recognition method according to claim 35, wherein said inputting step inputs the blocks of pattern data having a predetermined size by scanning input data.

40. A pattern recognition method according to claim 39, further comprising a scanning control step of changing a scanning position in said inputting step on the basis of the likelihood of presence of a high-order pattern to be detected, determined in said consolidation step.

41. A pattern recognition method according to claim 35, further comprising a control step for time-sequentially changing an operation characteristic in said detection step.

42. A pattern recognition method according to claim 35, wherein said detection step extracts a predetermined local feature at each position in the data.

43. A pattern recognition method according to claim 42, wherein said consolidation step further includes storing a detection result of a local feature together with associated position information into a predetermined primary storage unit.

44. A pattern recognition method according to claim 35, wherein said outputting step further includes outputting information indicating the position, in the input data, of a pattern of a specified category, together with information indicating the category.

45. A pattern recognition method according to claim 35, wherein said consolidation step further includes consolidating patterns detected at scanning positions on the basis of the position information, and said outputting step judges whether there is a high-order pattern including the detected patterns.

46. A pattern recognition method according to claim 35, further comprising a control step of controlling an operation characteristic in said detection step so that patterns of different categories with different sizes can be detected in the input pattern data.

47. A pattern recognition method according to claim 35, wherein the detection map information is information about a position of the pattern and at least one of a type and a detection level of the pattern.

48. A pattern recognition method comprising the steps of:

scanning image data of a predetermined size at a plurality of scanning positions;

detecting a predetermined feature from each of the scanned image data;

predicting a category and a position of first scanned image data to be detected on the basis of second scanned image data which has been detected;

changing a scanning position at which the image data is scanned in said scanning step to the position predicted by said prediction step;

consolidating a plurality of features detected at different scanning positions on the basis of the scanning position of each detected feature, said consolidation means comparing a category of the first scanned image data detected at the predicted position with the predicted category and determining, on the basis of the result, the likelihood of presence of a specific pattern formed by the first scanned image data; and judging the position and the type of the specific pattern, on the basis of the output from said consolidation step.

* * * * *

UNITED STATES PATENT AND TRADEMARK OFFICE
CERTIFICATE OF CORRECTION

PATENT NO. : 7,274,819 B2 Page 1 of 1
APPLICATION NO. : 10/156942
DATED : September 25, 2007
INVENTOR(S) : Matsugu It is certified that error appears in the above-identified patent and that said Letters Patent is hereby corrected as shown below:

COLUMN 2:
Line 31, "is object" should read -- is the object --.

COLUMN 3:
Line 56, "of a imaging" should read -- of an imaging --.

COLUMN 7:
Line 17, "substantially" should read -- substantial --; and
Line 18, "synapitc" should read -- synaptic --.

COLUMN 15:
Line 43, "temporarlity" should read -- temporarily --.

COLUMN 20:
Line 40, "changing," should read -- changing --.

COLUMN 21:
Line 58, "is parallel" should read -- is a parallel --.

Signed and Sealed this

Tenth Day of June, 2008

JON W. DUDAS
*Director of the United States Patent and Trademark Office*